(12) United States Patent
Sakaguchi et al.

(10) Patent No.: US 12,522,283 B2
(45) Date of Patent: Jan. 13, 2026

(54) TRANSPORTATION VEHICLE

(71) Applicant: Hitachi Construction Machinery Co., Ltd., Tokyo (JP)

(72) Inventors: Yoji Sakaguchi, Tsuchiura (JP); Hirokazu Shimomura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 18/867,661

(22) PCT Filed: Aug. 28, 2023

(86) PCT No.: PCT/JP2023/031019
§ 371 (c)(1),
(2) Date: Nov. 20, 2024

(87) PCT Pub. No.: WO2024/048527
PCT Pub. Date: Mar. 7, 2024

(65) Prior Publication Data
US 2025/0326430 A1     Oct. 23, 2025

(30) Foreign Application Priority Data

Aug. 29, 2022   (JP) .................................. 2022-135841
Aug. 29, 2022   (JP) .................................. 2022-135878

(51) Int. Cl.
*B62D 5/07*      (2006.01)
*B60K 11/04*     (2006.01)
(Continued)

(52) U.S. Cl.
CPC .............. *B62D 5/075* (2013.01); *B60K 11/04* (2013.01); *B60P 1/162* (2013.01); *B62D 5/07* (2013.01); *B62D 5/14* (2013.01)

(58) Field of Classification Search
CPC . B62D 5/07; B62D 5/075; B62D 5/14; B60K 11/04; B60P 1/16; B60P 1/162;
(Continued)

(56) References Cited

U.S. PATENT DOCUMENTS 6,076,488 A  *  6/2000   Yamagishi ............... F01P 7/044
                                                            123/41.31
6,481,388 B1 * 11/2002   Yamamoto ............... F01P 7/044
                                                            123/41.1
(Continued)

FOREIGN PATENT DOCUMENTS

CN         103213492 A  *  7/2013  .............. F01P 5/043
CN         103459726 A  * 12/2013  ......... B60H 1/00378
(Continued)

OTHER PUBLICATIONS

International Preliminary Report on Patentability (PCT/IB/338 & PCT/IB/373) issued in PCT Application No. PCT/JP2023/031019 dated Mar. 13, 2025, including English translation of Written Opinion (PCT/ISA/237) (6 pages).
(Continued)

*Primary Examiner* — Keith J Frisby
(74) *Attorney, Agent, or Firm* — Crowell & Moring LLP

(57) ABSTRACT

A transportation vehicle includes: a cooling fan that is driven by a hydraulic motor; a heat exchanger that is disposed in a front portion of a vehicle body; a fan control valve that controls a flow of a hydraulic operating fluid supplied to the hydraulic motor; a cylinder control valve that controls a flow of the hydraulic operating fluid supplied to a hydraulic cylinder; and a controller. The fan control valve and the cylinder control valve are connected in tandem to a center bypass line. The fan control valve has a neutral position that makes a first hydraulic pump and the cylinder control valve communicate with each other and makes a suction port and a delivery port of the hydraulic motor and a hydraulic
(Continued)

operating fluid tank communicate with each other, and a rotation position that makes the first hydraulic pump and the suction port of the hydraulic motor communicate with each other and makes the delivery port of the hydraulic motor and the hydraulic operating fluid tank communicate with each other.

8 Claims, 11 Drawing Sheets

(51) Int. Cl.
*B60P 1/16* (2006.01)
*B62D 5/14* (2006.01)

(58) Field of Classification Search
CPC ....... E02F 9/226; E02F 9/2296; E02F 9/0866; E02F 9/2292; E02F 9/2235; E02F 9/2095
USPC ................ 180/53.4, 68.1; 60/456; 123/41.49
See application file for complete search history.

(56) References Cited

U.S. PATENT DOCUMENTS

| | | | | |
|---|---|---|---|---|
| 8,051,649 B2* | 11/2011 | Yoshimoto | ............. | F15B 21/08 60/329 |
| 11,046,314 B2* | 6/2021 | Nakamura | ............ | B60W 10/02 |
| 11,384,512 B2* | 7/2022 | Nakashima | ........... | E02F 9/2296 |
| 11,649,816 B2* | 5/2023 | Tanaka | .................. | E02F 9/2296 60/449 |
| 2003/0156949 A1* | 8/2003 | Shimomura | ............ | F04B 49/08 417/213 |
| 2009/0217655 A1* | 9/2009 | Yabuki | .................... | F01P 7/044 123/563 |
| 2010/0218494 A1* | 9/2010 | Yasuda | ................. | E02F 9/2242 60/459 |
| 2010/0303643 A1* | 12/2010 | Kataoka | ................ | E02F 9/2203 417/213 |
| 2014/0026550 A1* | 1/2014 | Brinkman | ................ | F15B 21/14 60/484 |
| 2015/0247511 A1* | 9/2015 | Barr | ........................ | E02F 9/226 137/571 |
| 2015/0308079 A1* | 10/2015 | Vigholm | ................ | G05B 15/02 700/282 |
| 2016/0251832 A1* | 9/2016 | Kure | ....................... | F01P 5/043 180/68.1 |
| 2024/0208389 A1* | 6/2024 | Iijima | ..................... | B60P 1/162 |

FOREIGN PATENT DOCUMENTS

| | | | | | |
|---|---|---|---|---|---|
| CN | 106223380 | A | * | 12/2016 | ................ E02F 3/42 |
| CN | 113062889 | A | * | 7/2021 | ................ F15B 1/02 |
| GB | 2059639 | A | * | 4/1981 | ............. F01P 7/044 |
| GB | 2204359 | A | * | 11/1988 | ............. F01P 7/044 |
| JP | 5-39053 | A | | 2/1993 | |
| JP | H0658263 | A | * | 3/1994 | |
| JP | 2001173602 | A | * | 6/2001 | |
| JP | 2003343269 | A | * | 12/2003 | |
| JP | 2005-344766 | A | | 12/2005 | |
| JP | 2006063882 | A | * | 3/2006 | |
| JP | 2008267565 | A | * | 11/2008 | |
| JP | 2011231678 | A | * | 11/2011 | |
| JP | 2011247182 | A | * | 12/2011 | |
| JP | 2012225460 | A | * | 11/2012 | |
| JP | 2013-79626 | A | | 5/2013 | |
| JP | 2014062371 | A | * | 4/2014 | |
| JP | 2014-118902 | A | | 6/2014 | |
| JP | 2016-118154 | A | | 6/2016 | |
| JP | 2019-49238 | A | | 3/2019 | |
| KR | 20060112340 | A | * | 11/2006 | ................ F01P 5/02 |
| KR | 101751086 | B1 | * | 6/2017 | ............ B60K 11/08 |
| WO | WO-0196748 | A1 | * | 12/2001 | .......... F15B 11/0445 |
| WO | WO-2007060948 | A1 | * | 5/2007 | ............ E02F 9/2292 |
| WO | WO-2015019489 | A1 | * | 2/2015 | ............ F15B 11/17 |
| WO | WO-2019188415 | A1 | * | 10/2019 | ............ F02D 45/00 |
| WO | WO-2020195013 | A1 | * | 10/2020 | ............ F01P 11/16 |

OTHER PUBLICATIONS

International Search Report (PCT/ISA/210) issued in PCT Application No. PCT/JP2023/031019 dated Oct. 24, 2023 with English translation (5 pages).
Japanese-language Written Opinion (PCT/ISA/237) issued in PCT Application No. PCT/JP2023/031019 dated Oct. 24, 2023 with English translation (7 pages).

* cited by examiner

[FIG. 1]
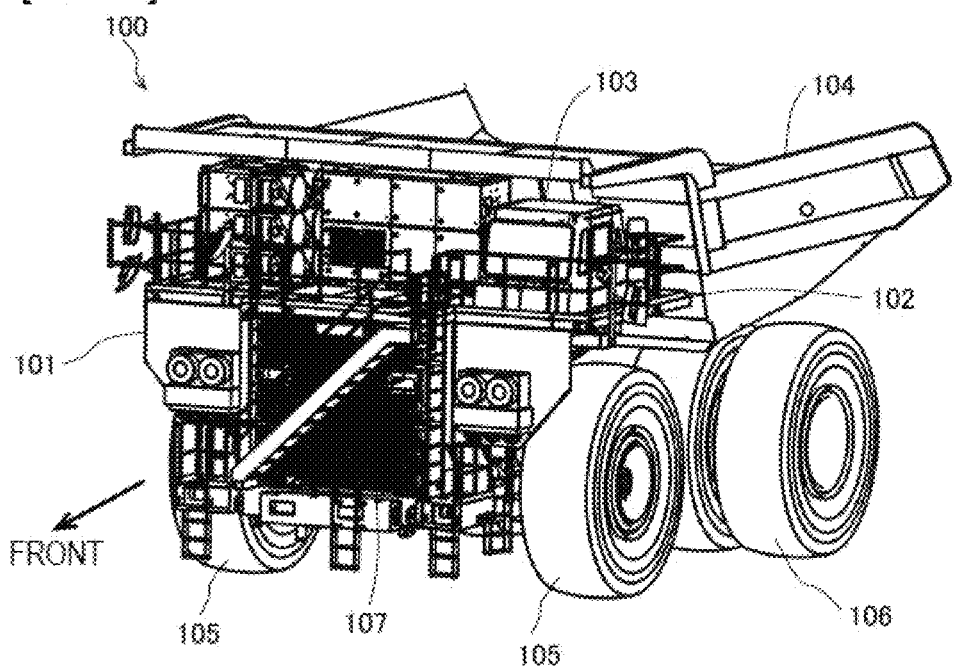
[FIG. 2]
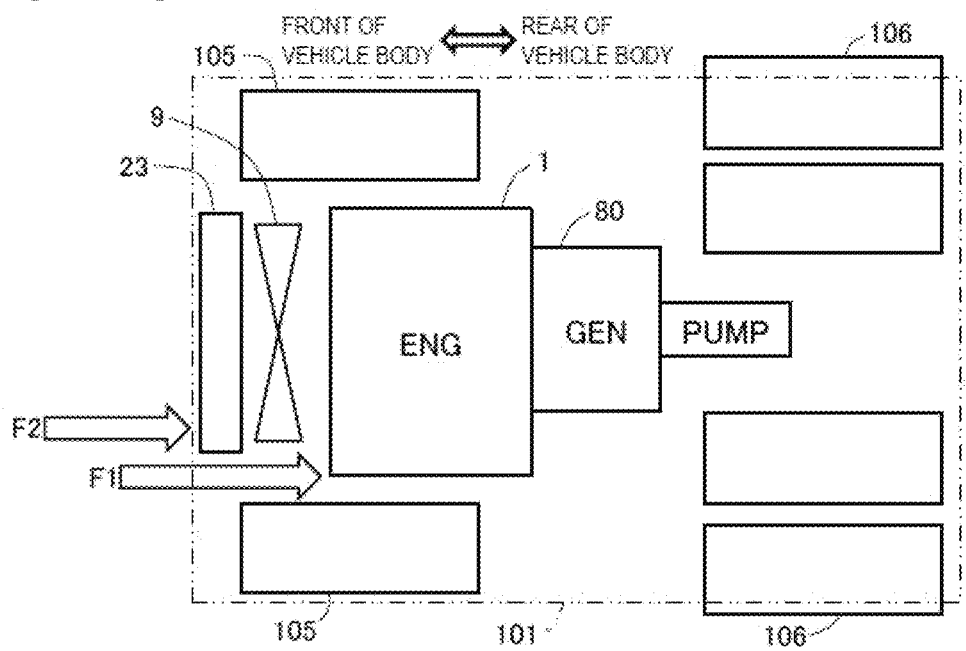

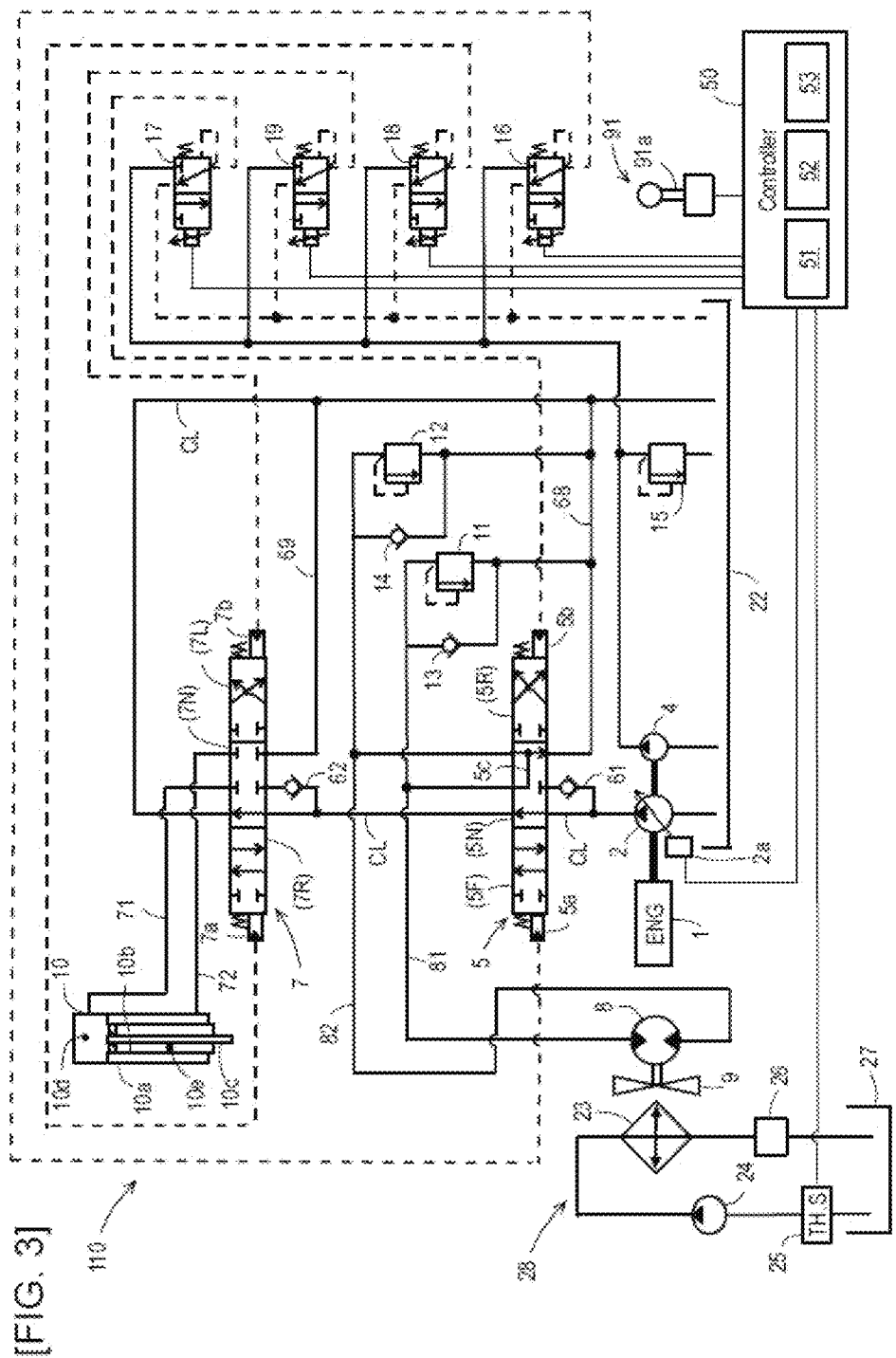
[FIG. 3]

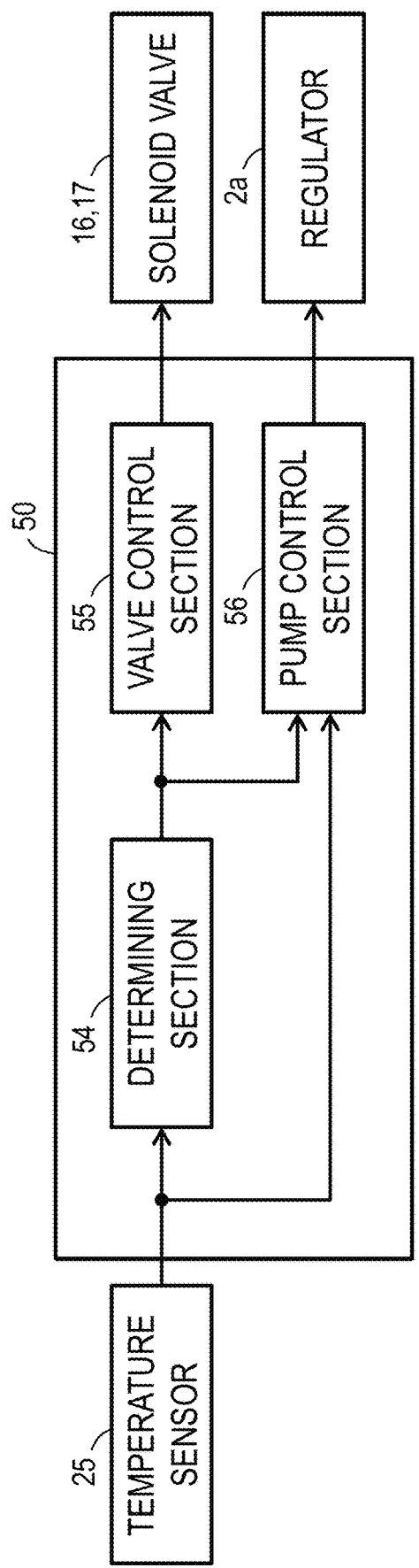
[FIG. 4]

[FIG. 5]
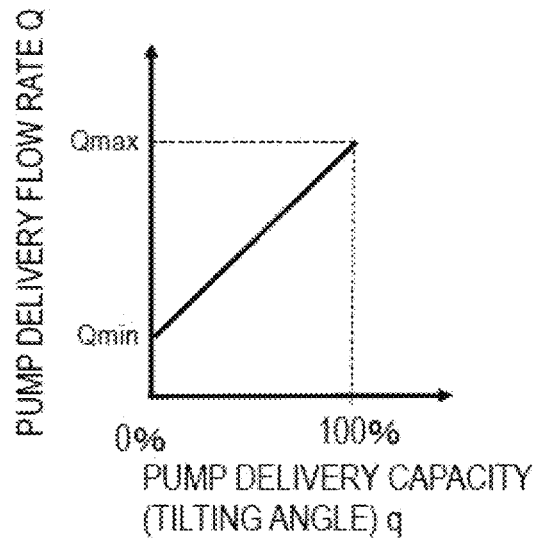
[FIG. 6]
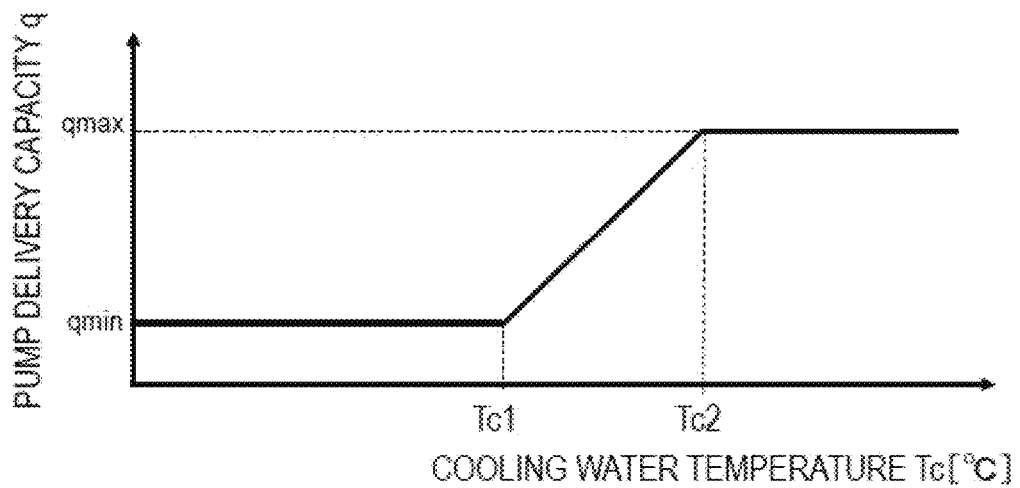

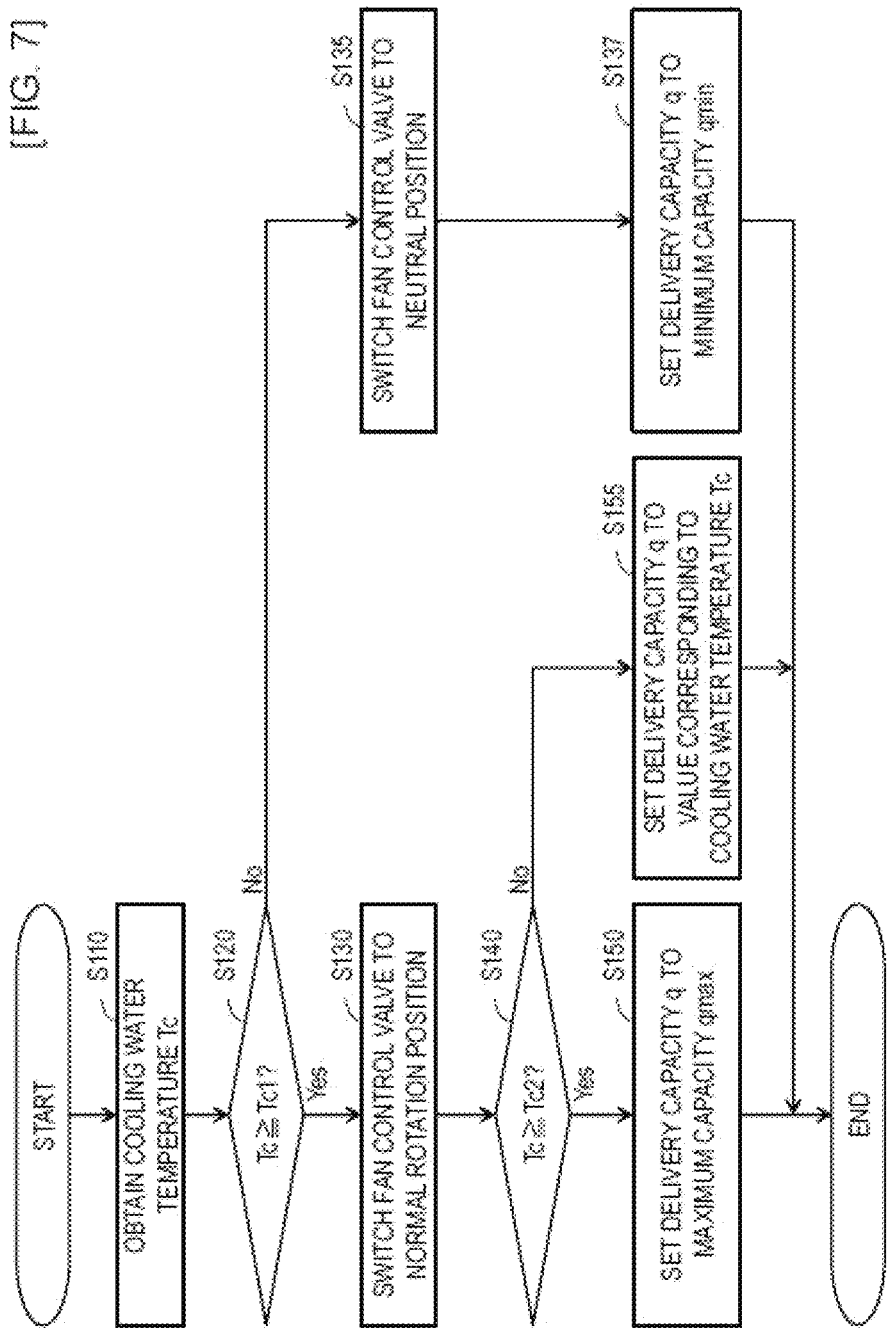
[FIG. 7]

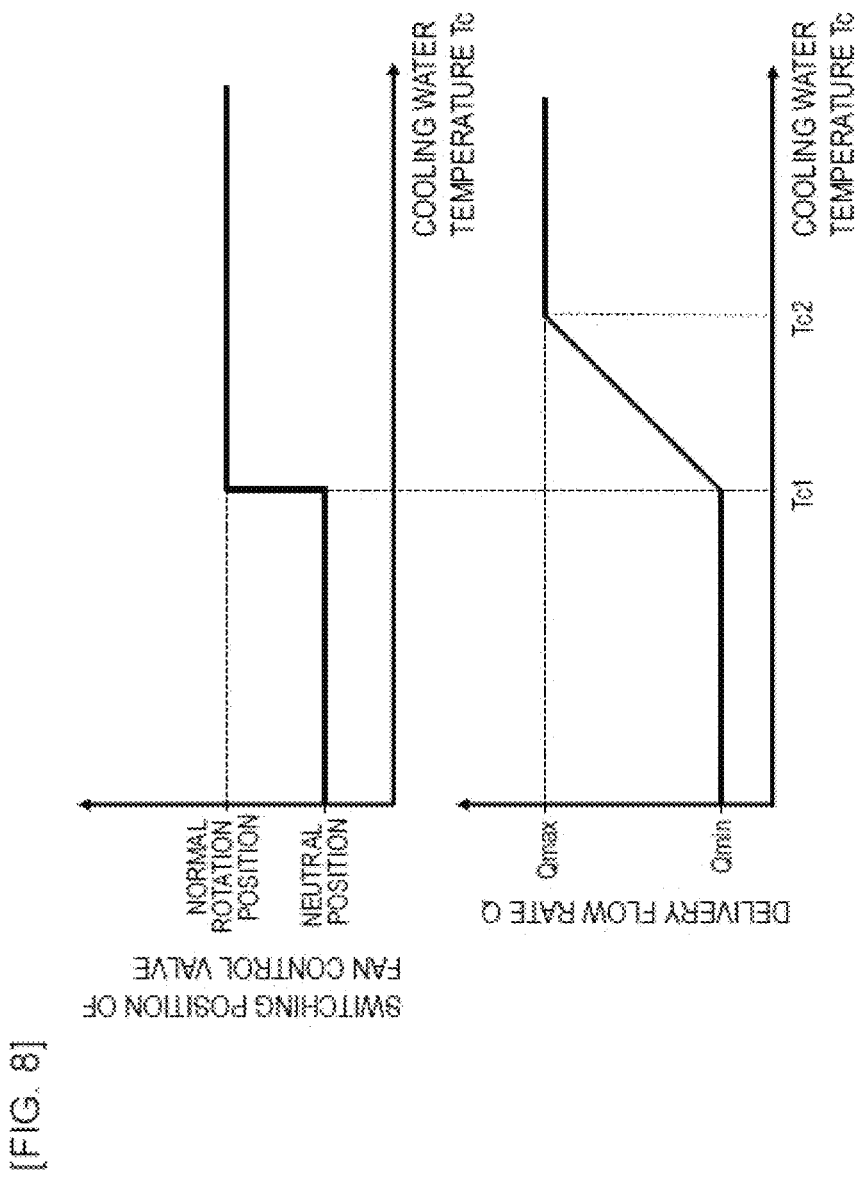
[FIG. 8]

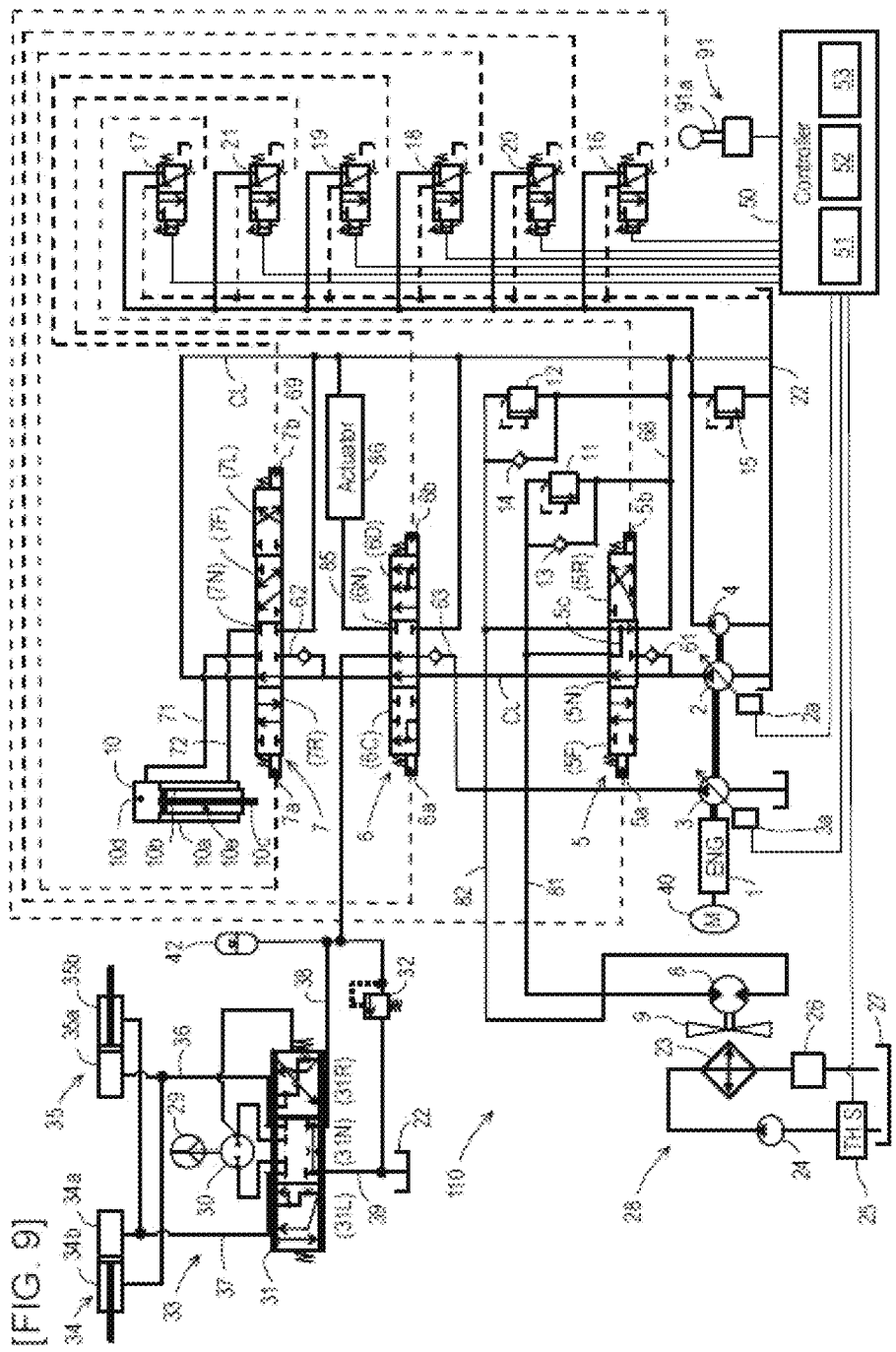
[FIG. 9]

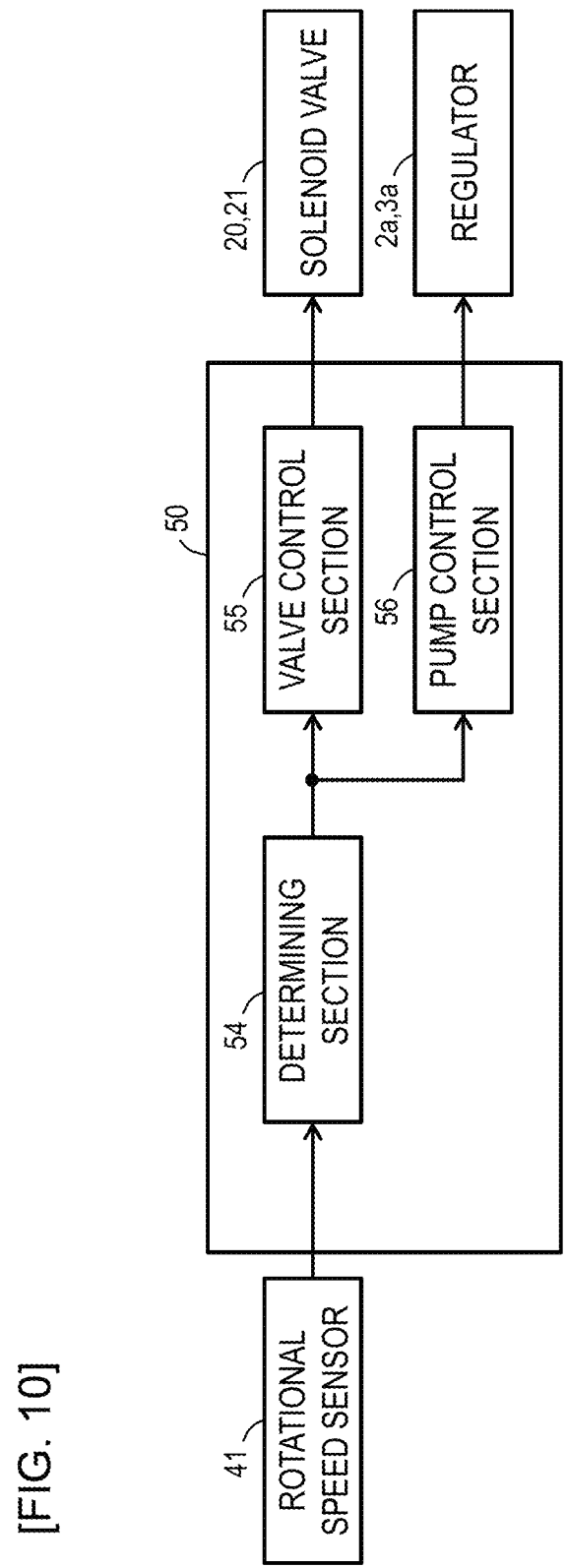
[FIG. 10]

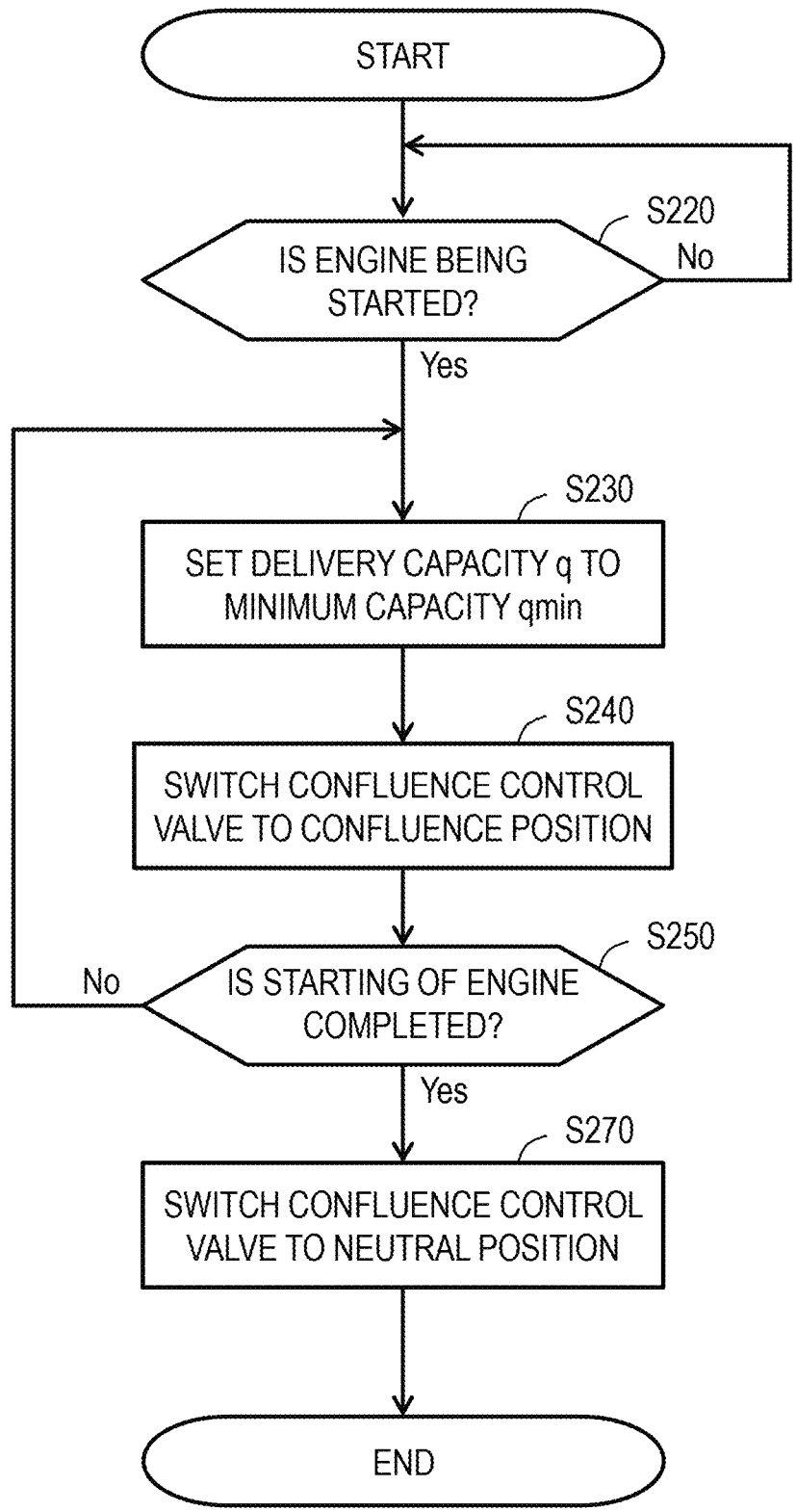
[FIG. 11]

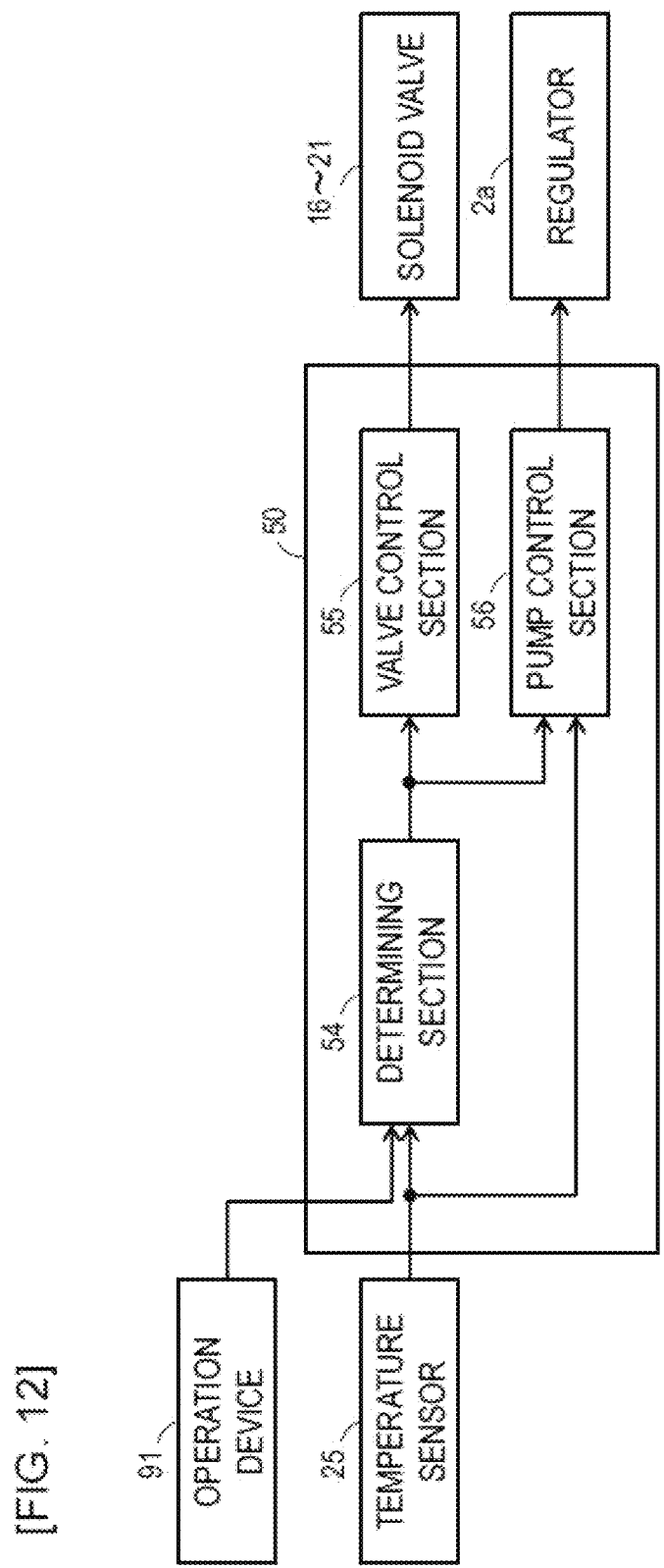
[FIG. 12]

[FIG. 13]

| OPERATION POSITION | VALVE | Tc < Tc1 | Tc1 ≤ Tc < Tc3 | Tc3 ≤ Tc |
|---|---|---|---|---|
| NEUTRAL POSITION | HOIST CONTROL VALVE | NEUTRAL | NEUTRAL | NEUTRAL |
|  | CONFLUENCE CONTROL VALVE | NEUTRAL | NEUTRAL | NEUTRAL |
|  | FAN CONTROL VALVE | NEUTRAL | NORMAL ROTATION | NORMAL ROTATION |
| RAISING POSITION | HOIST CONTROL VALVE | RAISING | RAISING | RAISING |
|  | CONFLUENCE CONTROL VALVE | CONFLUENCE | CONFLUENCE | CONFLUENCE |
|  | FAN CONTROL VALVE | NEUTRAL | NEUTRAL | NORMAL ROTATION |
| LOWERING POSITION | HOIST CONTROL VALVE | LOWERING | LOWERING | LOWERING |
|  | CONFLUENCE CONTROL VALVE | NEUTRAL | NEUTRAL | NEUTRAL |
|  | FAN CONTROL VALVE | NEUTRAL | NEUTRAL | NORMAL ROTATION |
| FLOATING POSITION | HOIST CONTROL VALVE | FLOATING | FLOATING | FLOATING |
|  | CONFLUENCE CONTROL VALVE | NEUTRAL | NEUTRAL | NEUTRAL |
|  | FAN CONTROL VALVE | NEUTRAL | NORMAL ROTATION | NORMAL ROTATION |

TRANSPORTATION VEHICLE

TECHNICAL FIELD

The present invention relates to a transportation vehicle such as a dump truck that is provided with a cooling fan.

BACKGROUND ART

A transportation vehicle provided with a cooling fan is known (see Patent Document 1). A cooling air generated by the cooling fan cools a cooling object such as engine cooling water. Patent Document 1 discloses a controller that performs first control for setting the rotational speed of the cooling fan according to the temperature of the cooling object when the temperature of the cooling object is higher than a lower limit threshold temperature and second control for setting the rotational speed of the cooling fan to a minimum rotational speed and making the cooling fan perform a reverse rotation when the temperature of the cooling object is lower than the lower limit threshold temperature.

PRIOR ART DOCUMENT

Patent Documents

Patent Document 1: JP-2014-118902-A

SUMMARY OF THE INVENTION

Problem to be Solved by the Invention

In the transportation vehicle such as a dump truck, a heat exchanger such as a radiator and the cooling fan may be arranged in a front portion of a vehicle body. In addition, a load on the transportation vehicle at a time of travelling changes according to the presence or absence of a cargo, a road gradient, and the like. For example, unloaded travelling, level ground travelling, and the like are low-load travelling states as compared with cargo travelling, uphill travelling, and the like. When the cooling fan continues to generate the cooling air in a low-load travelling state, the cooling air and a travelling wind may overcool the cooling object (such as the engine cooling water). Accordingly, stopping the cooling fan is considered in order to prevent the overcooling. As a method for stopping the cooling fan, a method of interrupting the supply of a hydraulic operating fluid from a hydraulic fluid source such as a hydraulic pump to a hydraulic motor that drives the cooling fan is considered.

In the vehicle described in Patent Document 1, a control valve (switching valve) that switches a supply destination of the hydraulic operating fluid, which is supplied from the hydraulic fluid source, to a fan control valve or to a cargo handling device is provided on an upstream side of the fan control valve that controls the rotational direction of the fan. That is, in the vehicle described in Patent Document 1, the hydraulic fluid source is shared between the cargo handling device and the hydraulic motor of the cooling fan.

Hence, with the configuration described in Patent Document 1, the overcooling can be prevented by, for example, switching the supply destination of the hydraulic operating fluid, which is supplied from the hydraulic fluid source, to the cargo handling device, and thereby stopping the cooling fan in a low-load travelling state. However, there arises such a problem that a plurality of control valves are provided to a hydraulic circuit, and the hydraulic circuit has a complex configuration.

It is an object of the present invention to provide a transportation vehicle that can prevent an overcooling of a cooling object with a simple configuration.

Means for Solving the Problem

A transportation vehicle according to one aspect of the present invention includes: at least one hydraulic pump that is driven by a prime mover; a hydraulic motor that is driven by a hydraulic operating fluid supplied from a first hydraulic pump of the at least one hydraulic pump; a cooling fan that is driven by the hydraulic motor; a heat exchanger that is disposed in a front portion of a vehicle body, and cools a cooling object by cooling air generated by the cooling fan; a hydraulic cylinder that is driven by the hydraulic operating fluid supplied from the first hydraulic pump; a fan control valve that controls a flow of the hydraulic operating fluid supplied from the first hydraulic pump to the hydraulic motor; a cylinder control valve that controls a flow of the hydraulic operating fluid supplied from the first hydraulic pump to the hydraulic cylinder; and a controller that controls the fan control valve and a delivery capacity of the at least one hydraulic pump. In the transportation vehicle, the fan control valve and the cylinder control valve are connected in tandem to a hydraulic fluid line that connects the first hydraulic pump and a hydraulic operating fluid tank to each other. In addition, the fan control valve is disposed on an upstream side of the cylinder control valve, and the fan control valve has a neutral position that makes the first hydraulic pump and the cylinder control valve communicate with each other, interrupts communication between the first hydraulic pump and the hydraulic motor, and makes a suction port and a delivery port of the hydraulic motor and the hydraulic operating fluid tank communicate with each other, and further, the fan control valve has a rotation position that interrupts the communication between the first hydraulic pump and the cylinder control valve, makes the first hydraulic pump and the suction port of the hydraulic motor communicate with each other, and makes the delivery port of the hydraulic motor and the hydraulic operating fluid tank communicate with each other.

Advantages of the Invention

According to the present invention, it is possible to provide a transportation vehicle that can prevent an overcooling of a cooling object with a simple configuration.

BRIEF DESCRIPTION OF THE DRAWINGS

FIG. 1 is a perspective view illustrating an external appearance of a dump truck.

FIG. 2 is a plan schematic view illustrating a configuration of the dump truck.

FIG. 3 is a diagram illustrating a hydraulic system of the dump truck according to a first embodiment.

FIG. 4 is a functional block diagram of a controller according to the first embodiment.

FIG. 5 is a diagram illustrating a relation between a delivery capacity q (tilting angle) and a delivery flow rate Q of a first hydraulic pump.

FIG. 6 is a diagram illustrating a capacity control table that defines a relation between a cooling water temperature Tc and the delivery capacity q.

FIG. 7 is a flowchart illustrating an example of a flow of processing of fan control performed by the controller according to the first embodiment.

FIG. 8 is a diagram illustrating relations of a switching position of a fan control valve and the delivery flow rate Q of the first hydraulic pump corresponding to the cooling water temperature Tc.

FIG. 9 is a diagram illustrating a hydraulic system of a dump truck according to a second embodiment.

FIG. 10 is a functional block diagram of a controller according to a third embodiment.

FIG. 11 is a flowchart illustrating an example of a flow of processing of loss reduction control at a time of a start of an engine which processing is performed by the controller according to the third embodiment.

FIG. 12 is a functional block diagram of a controller according to a fourth embodiment.

FIG. 13 is a table illustrating the relation of the operation position of an operation device for a bed and the cooling water temperature to the switching positions of respective control valves.

MODES FOR CARRYING OUT THE INVENTION

First Embodiment

A transportation vehicle according to a first embodiment of the present invention will be described with reference to the drawings. FIG. 1 is a perspective view illustrating an external appearance of a dump truck 100 as an example of the transportation vehicle according to the first embodiment of the present invention. In the following description, unless otherwise specified, a forward direction of a cab seat (left front direction; see an arrow in the figure) is a forward direction of a vehicle body 101.

The dump truck 100 illustrated in FIG. 1 is a large-sized dump truck for operating at a mine or the like. The dump truck 100 includes a vehicle body 101, a cab 103, a bed 104, front wheels 105, and rear wheels 106. The cab 103 is supported by a supporting base 102, and is located on a front side and a left side on the vehicle body 101. The cab 103 forms an operation room that an operator of the dump truck 100 boards and alights from. Provided within the cab 103 are a cab seat, an accelerator pedal, a brake pedal, a steering wheel for steering (none is illustrated), an operation device 91 (see FIG. 3) for the bed, and the like.

The bed 104 is raisably and lowerably mounted on a rear portion of the vehicle body 101. The bed 104 is rotatably supported by a rear side of the vehicle body 101 via a coupling pin, and is moved vertically with the coupling pin as a pivot by an extending or contracting action of hoist cylinders 10 (see FIG. 3). The front wheels 105 travellably support the vehicle body 101 at a left and a right of a front portion of the vehicle body 101, and the rear wheels 106 travellably support the vehicle body 101 at a left and a right of a rear portion of the vehicle body 101. The front wheels 105 constitute steered wheels to be steered by the operator of the dump truck 100 (steering operation). The rear wheels 106 constitute driving wheels of the dump truck 100. The rear wheels 106 are rotationally driven by a travelling driving device (not illustrated).

A front surface of the vehicle body 101 is provided with a front grille 107. The front grille 107 is provided with a plurality of air holes for taking outside air into the inside of the vehicle body 101.

FIG. 2 is a plan schematic view illustrating a configuration of the dump truck 100. As illustrated in FIG. 2, mounted within the vehicle body 101 are an engine 1, a generator 80 connected to the engine 1, a plurality of hydraulic pumps connected to the engine 1, a cooling fan 9 for generating cooling air, and a radiator 23 as a heat exchanger for cooling engine cooling water by the cooling air generated by the cooling fan 9. The engine cooling water is a refrigerant for cooling the engine 1, and is a cooling object to be cooled by the cooling air generated by the cooling fan 9. Incidentally, while FIG. 2 illustrates only the radiator 23 as a heat exchanger, a heat exchanger such as an oil cooler for cooling a hydraulic operating fluid may be mounted.

The engine 1 as a prime mover is constituted by, for example, a large-sized diesel engine. The cooling fan 9 is driven by a fan motor 8 (see FIG. 3) to be described later. The cooling fan 9 sucks in outside air from the front side of the vehicle body 101 through the front grille 107, and generates the cooling air that flows from the front side of the vehicle body 101 to the rear side thereof (see arrow F1). The radiator 23 is disposed on the rear side of the front grille 107. The radiator 23 is therefore cooled by the cooling air.

The radiator 23 performs heat exchange with the cooling air (air) generated by the cooling fan 9, and thereby cools the engine cooling water heated by the engine 1. The engine cooling water cooled by the radiator 23 returns to the engine 1, and cools the engine 1. Incidentally, the radiator 23 is disposed in the front portion of the vehicle body 101, and therefore receives a travelling wind (see an arrow F2). Hence, the engine cooling water within the radiator 23 is cooled not only by the cooling air but also by the travelling wind.

A hydraulic system 110 of the dump truck 100 will be described with reference to FIG. 3. As illustrated in FIG. 3, the hydraulic system 110 of the dump truck 100 includes: a variable displacement type hydraulic pump (hereinafter written as a first hydraulic pump) 2 and a fixed displacement type hydraulic pump (hereinafter written as a pilot pump) 4 that are driven by the engine 1; a pair of hoist cylinders (only one hoist cylinder is illustrated in FIG. 3) 10 that are driven by the hydraulic operating fluid supplied from the first hydraulic pump 2; a fan motor 8 that is driven by the hydraulic operating fluid supplied from the first hydraulic pump 2; a hydraulic operating fluid tank 22 that stores the hydraulic operating fluid; a fan control valve 5 and a hoist control valve 7 that are provided on a center bypass line CL as a hydraulic fluid line that connects the first hydraulic pump 2 and the hydraulic operating fluid tank 22 to each other; and a controller 50 that controls various parts of the dump truck 100.

The first hydraulic pump (main pump) 2 sucks in the hydraulic operating fluid from the hydraulic operating fluid tank 22 and delivers a high-pressure hydraulic operating fluid (pressurized fluid), by being driven by the engine 1. A delivery port of the first hydraulic pump 2 is connected to the hydraulic operating fluid tank 22 via the center bypass line CL. The fan control valve 5 and the hoist control valve 7 are connected in tandem with each other along the center bypass line CL. The fan control valve 5 controls a flow of the hydraulic operating fluid supplied from the first hydraulic pump 2 to the fan motor 8 and a flow of the hydraulic operating fluid discharged from the fan motor 8 to the hydraulic operating fluid tank 22. The hoist control valve 7 is a cylinder control valve that controls a flow of the hydraulic operating fluid supplied from the first hydraulic pump 2 to the hoist cylinder 10 and a flow of the hydraulic operating fluid discharged from the hoist cylinder 10 to the hydraulic operating fluid tank 22.

The fan control valve 5 is connected with a supply hydraulic fluid line 61 that branches from the center bypass line CL. The hoist control valve 7 is provided on a downstream side of the fan control valve 5 on the center bypass line CL. The hoist control valve 7 is connected with a supply hydraulic fluid line 62 that branches from the center bypass line CL. A return oil from the fan motor 8 is discharged into the hydraulic operating fluid tank 22 through a return hydraulic fluid line 68. A return oil from the hoist cylinder 10 is discharged into the hydraulic operating fluid tank 22 through a return hydraulic fluid line 69.

The fan motor 8 is a hydraulic motor that rotationally drives the cooling fan 9. An inlet and an outlet (a suction port and a delivery port) of the fan motor 8 are connected to the fan control valve 5 by a pair of motor hydraulic fluid lines 81 and 82. The pair of motor hydraulic fluid lines 81 and 82 is each connected to the first hydraulic pump 2 and the hydraulic operating fluid tank 22 via the fan control valve 5.

The motor hydraulic fluid line 81 is connected with a relief valve 11 that defines a maximum pressure of the motor hydraulic fluid line 81. The motor hydraulic fluid line 82 is provided with a relief valve 12 that defines a maximum pressure of the motor hydraulic fluid line 82. When pressure within the pair of motor hydraulic fluid lines 81 and 82 exceeds a predetermined value, the pair of relief valves 11 and 12 lets the hydraulic operating fluid escape to the hydraulic operating fluid tank 22, and thereby protects hydraulic equipment of a fan circuit including the pair of motor hydraulic fluid lines 81 and 82.

A pair of check valves 13 and 14 for makeup is provided between the pair of motor hydraulic fluid lines 81 and 82 and the return hydraulic fluid line 68. The check valve 13 is a check valve that allows a flow of the hydraulic operating fluid from the return hydraulic fluid line 68 to the motor hydraulic fluid line 81, and inhibits a flow of the hydraulic operating fluid from the motor hydraulic fluid line 81 to the return hydraulic fluid line 68. The check valve 14 is a check valve that allows a flow of the hydraulic operating fluid from the return hydraulic fluid line 68 to the motor hydraulic fluid line 82, and inhibits a flow of the hydraulic operating fluid from the motor hydraulic fluid line 82 to the return hydraulic fluid line 68.

When a negative pressure occurs within the motor hydraulic fluid line 81 or the motor hydraulic fluid line 82 in a case where the fan motor 8 performs inertial rotation or in a case where the fan motor 8 is rotated by the travelling wind, the pair of check valves 13 and 14 resupplies the hydraulic operating fluid within the hydraulic operating fluid tank 22 into the motor hydraulic fluid lines 81 and 82 having a negative pressure through the return hydraulic fluid line 68.

The hoist cylinder 10 is provided between the vehicle body 101 (see FIG. 1) and the bed 104 (see FIG. 1). The hoist cylinder 10 is a single-stage or multi-stage hydraulic cylinder that raises and lowers the bed 104. Incidentally, FIG. 3 illustrates a two-stage hoist cylinder 10. The hoist cylinder 10 illustrated in FIG. 3 includes: an outer cylinder portion 10a on the outside; an inner cylinder portion 10b that is slidably provided within the outer cylinder portion 10a and demarcates the inside of the outer cylinder portion 10a into a bottom side oil chamber 10d on an upper side and a rod side oil chamber 10e on a lower side; and a piston rod 10c extendably and contractably provided within the inner cylinder portion 10b.

The hoist cylinder 10 is extended when the hydraulic operating fluid (pressurized fluid) delivered from the first hydraulic pump 2 is supplied to the bottom side oil chamber 10d and the hydraulic operating fluid (return oil) is discharged from the rod side oil chamber 10e. When the hoist cylinder 10 is extended, the bed 104 is rotated upward with the coupling pin as a pivot. When the rotating operation is completed, the bed 104 is set in a soil discharge posture inclined obliquely rearward and downward. The hoist cylinder 10 is contracted when the hydraulic operating fluid (pressurized fluid) delivered from the first hydraulic pump 2 is supplied to the rod side oil chamber 10e and the hydraulic operating fluid (return oil) is discharged from within the bottom side oil chamber 10d. When the hoist cylinder 10 is contracted, the bed 104 is rotated downward with the coupling pin as a pivot. When the rotating operation is completed, the bed 104 is in a laid transportation posture.

The bottom side oil chamber 10d and the rod side oil chamber 10e of the hoist cylinder 10 are connected to the hoist control valve 7 by a pair of actuator hydraulic fluid lines 71 and 72. The pair of actuator hydraulic fluid lines 71 and 72 is connected to the first hydraulic pump 2 and the hydraulic operating fluid tank 22 via the hoist control valve 7. The actuator hydraulic fluid line 71 is connected to the bottom side oil chamber 10d of the hoist cylinder 10. The actuator hydraulic fluid line 72 is connected to the rod side oil chamber 10e of the hoist cylinder 10.

The fan control valve 5 is constituted by, for example, a six-port three-position hydraulic pilot type directional control valve. The fan control valve 5 is formed by using a single directional control valve, and has hydraulic pilot portions 5a and 5b on both of a left side and a right side thereof.

The fan control valve 5 is a selector valve in which a spool (valve disc) can be switched to a normal rotation position (5F), a reverse rotation position (5R), and a neutral position (5N). During a normal time, both of the hydraulic pilot portions 5a and 5b of the fan control valve 5 are connected to the hydraulic operating fluid tank 22, and the spool of the fan control valve 5 is retained in the neutral position (5N) by centering springs.

When the spool of the fan control valve 5 is in the neutral position (5N), an upstream side and a downstream side of the fan control valve 5 in the center bypass line CL communicate with each other, and the communication of the supply hydraulic fluid line 61 with the motor hydraulic fluid lines 81 and 82 is interrupted. That is, in the neutral position (5N), the first hydraulic pump 2 and the hoist control valve 7 communicate with each other, and communication between the first hydraulic pump 2 and the fan motor 8 is interrupted. The hydraulic operating fluid delivered from the first hydraulic pump 2 is thereby supplied to the hoist control valve 7 through the fan control valve 5. In addition, when the spool of the fan control valve 5 is in the neutral position (5N), a communication line 5c of the fan control valve 5 connects the pair of motor hydraulic fluid lines 81 and 82 to each other, and connects the pair of motor hydraulic fluid lines 81 and 82 to the return hydraulic fluid line 68. In the neutral position (5N), the suction port and the delivery port of the fan motor 8 and the hydraulic operating fluid tank 22 communicate with each other via the communication line 5c, so that rotation of the cooling fan 9 by an external force is allowed.

When the spool of the fan control valve 5 is in the normal rotation position (5F), the supply hydraulic fluid line 61 and the motor hydraulic fluid line 81 communicate with each other, and the motor hydraulic fluid line 82 and the return hydraulic fluid line 68 communicate with each other. That is, in the normal rotation position (5F), the communication between the suction port and the delivery port of the fan motor 8 and the hydraulic operating fluid tank 22 via the communication line 5c is interrupted, the suction port of the fan motor 8 and the first hydraulic pump 2 communicate with each other, and the delivery port of the fan motor 8 and the hydraulic operating fluid tank 22 communicate with each other. Thus, the hydraulic operating fluid delivered from the first hydraulic pump 2 is supplied to the fan motor 8 through the supply hydraulic fluid line 61 and the motor hydraulic fluid line 81, so that the fan motor 8 rotates in a normal rotation direction. The hydraulic operating fluid discharged from the fan motor 8 is discharged into the hydraulic operating fluid tank 22 through the motor hydraulic fluid line 82 and the return hydraulic fluid line 68. When the spool of the fan control valve 5 is in the reverse rotation position (5R), the supply hydraulic fluid line 61 and the motor hydraulic fluid line 82 communicate with each other, and the motor hydraulic fluid line 81 and the return hydraulic fluid line 68 communicate with each other. That is, in the reverse rotation position (5R), the communication between the suction port and the delivery port of the fan motor 8 and the hydraulic operating fluid tank 22 via the communication line 5c is interrupted, the suction port of the fan motor 8 and the first hydraulic pump 2 communicate with each other, and the delivery port of the fan motor 8 and the hydraulic operating fluid tank 22 communicate with each other. Thus, the hydraulic operating fluid delivered from the first hydraulic pump 2 is supplied to the fan motor 8 through the supply hydraulic fluid line 61 and the motor hydraulic fluid line 82, so that the fan motor 8 rotates in a reverse rotation direction as a direction opposite from the normal rotation direction. The hydraulic operating fluid discharged from the fan motor 8 is discharged into the hydraulic operating fluid tank 22 through the motor hydraulic fluid line 81 and the return hydraulic fluid line 68.

Thus, the normal rotation position (5F) and the reverse rotation position (5R) are rotation positions at which the first hydraulic pump 2 and the fan motor 8 are made to communicate with each other, and the fan motor 8 is rotated by the hydraulic operating fluid delivered from the first hydraulic pump 2. Incidentally, when the spool of the fan control valve 5 is in a rotation position (5F) or (5R), the communication between the first hydraulic pump 2 and the hoist control valve 7 via the center bypass line CL is interrupted.

The hoist control valve 7 is constituted by, for example, a six-port three-position hydraulic pilot type directional control valve. The hoist control valve 7 is formed by using a single directional control valve, and has hydraulic pilot portions 7a and 7b on both of a left side and a right side thereof.

The hoist control valve 7 is a selector valve in which a spool (valve disc) can be switched to a raising position (7R), a lowering position (7L), and a neutral position (7N). During a normal time, both of the hydraulic pilot portions 7a and 7b of the hoist control valve 7 are connected to the hydraulic operating fluid tank 22, and the spool of the hoist control valve 7 is retained in the neutral position (7N) by centering springs.

When the spool of the hoist control valve 7 is in the neutral position (7N), communication of the supply hydraulic fluid line 62 and the return hydraulic fluid line 69 with the actuator hydraulic fluid lines 71 and 72 is interrupted. This stops the supply of the hydraulic operating fluid to the hoist cylinder 10 and the discharge of the hydraulic operating fluid from the hoist cylinder 10. The movement of the hoist cylinder 10 is therefore stopped. In addition, when the spool of the hoist control valve 7 is in the neutral position (7N), an upstream side and a downstream side of the hoist control valve 7 in the center bypass line CL communicate with each other.

When the spool of the hoist control valve 7 is in the raising position (7R), the supply hydraulic fluid line 62 and the actuator hydraulic fluid line 71 communicate with each other, and the actuator hydraulic fluid line 72 and the return hydraulic fluid line 69 communicate with each other. Incidentally, the communication between the upstream side and the downstream side of the hoist control valve 7 in the center bypass line CL is interrupted. Thus, when the fan control valve 5 is in the neutral position (5N), the hydraulic operating fluid delivered from the first hydraulic pump 2 is supplied to the bottom side oil chamber 10d of the hoist cylinder 10 through the supply hydraulic fluid line 62 and the actuator hydraulic fluid line 71. In addition, the hydraulic operating fluid within the rod side oil chamber 10e is discharged into the hydraulic operating fluid tank 22 through the actuator hydraulic fluid line 72 and the return hydraulic fluid line 69. The hoist cylinder 10 is thereby driven in an extending direction, that is, in a direction of raising the bed 104.

When the spool of the hoist control valve 7 is in the lowering position (7L), the supply hydraulic fluid line 62 and the actuator hydraulic fluid line 72 communicate with each other, and the actuator hydraulic fluid line 71 and the return hydraulic fluid line 69 communicate with each other. Incidentally, the communication between the upstream side and the downstream side of the hoist control valve 7 in the center bypass line CL is interrupted. Thus, when the fan control valve 5 is in the neutral position (5N), the hydraulic operating fluid delivered from the first hydraulic pump 2 is supplied to the rod side oil chamber 10e of the hoist cylinder 10 through the supply hydraulic fluid line 62 and the actuator hydraulic fluid line 72. In addition, the hydraulic operating fluid within the bottom side oil chamber 10d is discharged into the hydraulic operating fluid tank 22 through the actuator hydraulic fluid line 71 and the return hydraulic fluid line 69. The hoist cylinder 10 is thereby driven in a contracting direction, that is, in a direction of lowering the bed 104.

The pilot pump 4 is connected to a plurality of solenoid valves 16 to 19 via a pilot hydraulic fluid line. The pilot hydraulic fluid line between the pilot pump 4 and the plurality of solenoid valves 16 to 19 is provided with a pilot relief valve 15 that defines the pressure of the pilot hydraulic fluid line. The plurality of solenoid valves 16 to 19 are a pressure reducing valve that reduces the pressure of the pilot hydraulic fluid line (primary pressure) according to a control current from the controller 50, and outputs a pressure after the pressure reduction (secondary pressure) as a pilot pressure. When a control current for standby as an OFF signal is input to the solenoid valves 16 to 19, the solenoid valves 16 to 19 make the hydraulic pilot portions 5a, 5b, 7a, and 7b communicate with the hydraulic operating fluid tank 22. When a control current for driving as an ON signal is input to the solenoid valves 16 to 19, the solenoid valves 16 to 19 output generated pilot pressures to the hydraulic pilot portions 5a, 5b, 7a, and 7b.

The solenoid valves 16 and 17 for driving the fan control valve 5 operate in response to a control command (control current) output from the controller 50 so as to correspond to the temperature of the engine cooling water. The solenoid valves 18 and 19 for driving the hoist control valve 7 operate in response to a control command (control current) output from the controller 50 so as to correspond to operation of the operation device 91 for the bed.

The controller 50 is constituted by a computer including a processing device 51 such as a CPU (Central Processing Unit), an MPU (Micro Processing Unit), and a DSP (Digital Signal Processor), a nonvolatile memory 52 such as a ROM (Read Only Memory), a flash memory, and a hard disk drive, a volatile memory 53 referred to as what is called a RAM (Random Access Memory), an input-output interface, and other peripheral circuitry. These pieces of hardware cooperate with each other to make software operate, and thereby implement a plurality of functions. Incidentally, the controller 50 may be constituted by one computer, or may be constituted by a plurality of computers.

The nonvolatile memory 52 stores a program capable of performing various kinds of computations and data (data tables, threshold values, equations, and the like) used for the various kinds of computations. That is, the nonvolatile memory 52 is a storage medium (storage device) from which the program for implementing functions of the present embodiment is readable. The volatile memory 53 is a storage medium (storage device) that temporarily stores a result of computation by the processing device 51 and a signal input from the input-output interface. The processing device 51 is a device that expands the program stored in the nonvolatile memory 52 into the volatile memory 53, and executes the program by computation. The processing device 51 performs predetermined computation processing on data taken in from the input-output interface, the nonvolatile memory 52, and the volatile memory 53, according to the program.

The input-output interface of the controller 50 is connected with the operation device 91 for performing switching operation of the hoist control valve 7. The operation device 91 is constituted by an electric lever device, for example, and has an operation lever 91a that is manually tilted by the operator within the cab 103. The operation device 91 is operated to one of a neutral position, a raising position, and a lowering position corresponding to the respective switching positions of the hoist control valve 7, that is, the neutral position (7N), the raising position (7R), and the lowering position (7L). The operation device 91 outputs an operation signal according to an operation position to the controller 50.

A temperature sensor 25 is connected to the input-output interface of the controller 50. The temperature sensor 25 senses the temperature of the engine cooling water flowing through a cooling water system 28 of the engine 1, and outputs a signal indicating a result of the sensing to the controller 50. The cooling water system 28 includes: a cooling water tank 27 that stores the engine cooling water; a cooling water circulation pump 24 that sucks the engine cooling water within the cooling water tank 27 and delivers the engine cooling water; and the radiator 23 that cools the engine cooling water by the cooling air. The cooling water system 28 is a circulation system that can circulate the engine cooling water within the system by the cooling water circulation pump 24. The engine cooling water cools a cooling target object 26 such as the engine 1 by absorbing the heat of the cooling target object 26. The engine cooling water rises in temperature by receiving heat from the cooling target object 26. The engine cooling water that has risen in temperature is cooled in the radiator 23 by the cooling air generated by the cooling fan 9. The temperature sensor 25 is, for example, provided to the cooling water tank 27 or a line on a suction side of the cooling water circulation pump 24 to sense the temperature of the engine cooling water supplied to the radiator 23.

An input unit of the input-output interface converts signals input from various kinds of devices (the operation device 91, the temperature sensor 25, and the like) into data that can be subjected to computation by the processing device 51. In addition, an output unit of the input-output interface generates signals for output according to results of computation in the processing device 51, and outputs the signals to various kinds of devices (the solenoid valves 16 to 19, a regulator 2a, and the like).

The controller 50 outputs a control signal to the regulator 2a of the first hydraulic pump 2. The regulator 2a is a capacity control system that variably controls the displacement volume (delivery capacity per rotation) of the first hydraulic pump 2. When the first hydraulic pump 2 is a swash plate type piston pump, for example, the regulator 2a includes: a tilting actuator that controls the tilting angle (displacement volume) of a swash plate of the first hydraulic pump 2; and a solenoid proportional valve that generates a control pressure of the tilting actuator with a delivery pressure of the first hydraulic pump 2 as a source pressure.

The controller 50 controls the fan control valve 5, when the operation device 91 is operated to the neutral position, on the basis of a temperature Tc of the engine cooling water (which temperature will hereinafter be described also as a cooling water temperature) sensed by the temperature sensor 25. Details of control of the fan control valve 5 will be described later.

The controller 50 retains the hoist control valve 7 in the neutral position (7N) when the operation device 91 is operated to the neutral position. That is, the controller 50 outputs an OFF signal to both of the solenoid valves 18 and 19.

The controller 50 performs control to switch the hoist control valve 7 to the raising position (7R) when the operation device 91 is operated to the raising position. That is, the controller 50 outputs an ON signal to the solenoid valve 18, and outputs an OFF signal to the solenoid valve 19. Thus, a pilot pressure generated by the solenoid valve 18 acts on the hydraulic pilot portion 7a to switch the hoist control valve 7 to the raising position (7R). When the operation device 91 is operated to the lowering position, the controller 50 performs control to switch the hoist control valve 7 to the lowering position (7L). That is, the controller 50 outputs an OFF signal to the solenoid valve 18, and outputs an ON signal to the solenoid valve 19. Thus, a pilot pressure generated by the solenoid valve 19 acts on the hydraulic pilot portion 7b to switch the hoist control valve 7 to the lowering position (7L).

The controller 50 controls rotation and stopping of the fan motor 8 and a rotational direction of the fan motor 8 by controlling a switching position of the fan control valve 5. In addition, the controller 50 controls a rotational speed of the fan motor 8 by controlling a delivery capacity q of the first hydraulic pump 2 in a range from a minimum capacity qmin to a maximum capacity qmax via the regulator 2a. Referring to FIG. 4, description will be made of functions of the controller 50 which functions are related to control of the cooling fan 9 and the first hydraulic pump 2. FIG. 4 is a functional block diagram of the controller 50. As illustrated in FIG. 4, the controller 50 functions as a determining section 54, a valve control section 55, and a pump control section 56 by executing the program stored in the nonvolatile memory 52.

As illustrated in FIG. 4, the determining section 54 determines whether the cooling water temperature Tc sensed by the temperature sensor 25 is equal to or higher than a first threshold value Tc1. In addition, the determining section 54 determines whether the cooling water temperature Tc sensed by the temperature sensor 25 is equal to or higher than a second threshold value Tc2. The first threshold value Tc1 and the second threshold value Tc2 are stored in the nonvolatile memory 52 in advance. A magnitude relation between the first threshold value Tc1 and the second threshold value Tc2 is Tc1<Tc2. When the cooling water temperature Tc is lower than the first threshold value Tc1, the determining section 54 determines that a condition for stopping the cooling fan 9 is satisfied. Hence, the first threshold value Tc1 can be said to be a threshold value for determining whether to stop the driving of the cooling fan 9.

The valve control section 55 controls the switching position of the fan control valve 5 on the basis of a determination result of the determining section 54. When the determining section 54 determines that the condition for stopping the cooling fan 9 is not satisfied, the valve control section 55 outputs an ON signal to the solenoid valve 16 and outputs an OFF signal to the solenoid valve 17, and thereby switches the fan control valve 5 to the normal rotation position (5F). When the fan control valve 5 is switched to the normal rotation position (5F), the supply hydraulic fluid line 61 and the motor hydraulic fluid line 81 communicate with each other, and the motor hydraulic fluid line 82 and the return hydraulic fluid line 68 communicate with each other. Thus, the fan motor 8 is rotated by the hydraulic operating fluid supplied from the first hydraulic pump 2.

In addition, when the determining section 54 determines that the condition for stopping the cooling fan 9 is satisfied, the valve control section 55 outputs an OFF signal to the solenoid valves 16 and 17, and thereby switches the fan control valve 5 to the neutral position (5N). When the fan control valve 5 is switched to the neutral position (5N), the communication of the supply hydraulic fluid line 61 with the motor hydraulic fluid lines 81 and 82 is interrupted. In addition, the motor hydraulic fluid line 81, the motor hydraulic fluid line 82, and the hydraulic operating fluid tank 22 communicate with each other via the communication line 5c of the fan control valve 5. As a result, the fan motor 8 decelerates with the passage of time, and stops. While the fan motor 8 rotates by inertia, the hydraulic operating fluid is resupplied from the hydraulic operating fluid tank 22 via the communication line 5c of the fan control valve 5 in the neutral position (5N) and the check valve 13 or the check valve 14. The occurrence of cavitation in the fan motor 8 can therefore be prevented.

The pump control section 56 controls a delivery flow rate Q of the first hydraulic pump 2 on the basis of the cooling water temperature Tc sensed by the temperature sensor 25. Incidentally, the delivery flow rate Q of the first hydraulic pump 2 is determined by a rotational speed of the engine 1 and the delivery capacity (volume) q of the first hydraulic pump 2. The pump control section 56 according to the present embodiment controls the delivery flow rate Q of the first hydraulic pump 2 by controlling the delivery capacity q of the first hydraulic pump 2.

FIG. 5 is a diagram illustrating a relation between the delivery capacity q (corresponding to the tilting angle of the swash plate) and the delivery flow rate Q of the first hydraulic pump 2. As illustrated in FIG. 5, when the engine rotational speed is fixed, the delivery flow rate Q of the first hydraulic pump 2 increases proportionally according to increase in the delivery capacity q of the first hydraulic pump 2. When the delivery capacity q is a minimum value (0%), the delivery flow rate Q is a minimum flow rate Qmin. When the delivery capacity q is a maximum value (100%), the delivery flow rate Q is a maximum flow rate Qmax.

The pump control section 56 computes the delivery capacity q of the first hydraulic pump 2 by using a capacity control table (see FIG. 6) stored in the nonvolatile memory 52 in advance. FIG. 6 is a diagram illustrating the capacity control table that defines a relation between the cooling water temperature Tc and the delivery capacity q. As illustrated in FIG. 6, the relation between the cooling water temperature Tc and the delivery capacity q as defined by the capacity control table is as follows. When the cooling water temperature Tc is lower than the first threshold value Tc1, the delivery capacity q is the minimum capacity qmin. When the cooling water temperature Tc is equal to or higher than the first threshold value Tc1 and lower than the second threshold value Tc2, the delivery capacity q increases proportionally according to a rise in the cooling water temperature Tc. When the cooling water temperature Tc is equal to or higher than the second threshold value Tc2, the delivery capacity q is the maximum capacity qmax.

The pump control section 56 refers to the capacity control table, and computes the delivery capacity q of the first hydraulic pump 2 on the basis of the cooling water temperature Tc sensed by the temperature sensor 25. Hence, when the cooling water temperature Tc is lower than the first threshold value Tc1, the pump control section 56 controls the delivery capacity q of the first hydraulic pump 2 to the minimum capacity qmin. In addition, when the cooling water temperature Tc is equal to or higher than the first threshold value Tc1, the pump control section 56 controls the delivery capacity q of the first hydraulic pump 2 to a delivery capacity q higher than the minimum capacity qmin. Specifically, when the cooling water temperature Tc is equal to or higher than the first threshold value Tc1 and lower than the second threshold value Tc2, the pump control section 56 increases the delivery capacity q of the first hydraulic pump 2 as the cooling water temperature Tc rises, and when the cooling water temperature Tc is equal to or higher than the second threshold value Tc2, the pump control section 56 controls the delivery capacity q of the first hydraulic pump 2 to the maximum capacity qmax.

Referring to FIG. 7, description will be made of an example of a flow of processing of fan control performed by the controller 50. The processing illustrated in the flowchart of FIG. 7 is started by turning on an ignition switch (not illustrated), and is repeatedly performed in a predetermined control cycle.

As illustrated in FIG. 7, the controller 50 obtains the cooling water temperature Tc from the temperature sensor 25 in step S110, and then advances the processing to step S120. In step S120, the controller 50 determines whether the cooling water temperature Tc obtained in step S110 is equal to or higher than the first threshold value Tc1. When it is determined in step S120 that the cooling water temperature Tc is equal to or higher than the first threshold value Tc1, the processing proceeds to step S130. When it is determined in step S120 that the cooling water temperature Tc is lower than the first threshold value Tc1, the processing proceeds to step S135.

In step S130, the controller 50 outputs an ON signal to the solenoid valve 16, and outputs an OFF signal to the solenoid valve 17. When the ON signal is input to the solenoid valve 16, the solenoid valve 16 generates a pilot pressure, and the generated pilot pressure is input to the hydraulic pilot portion 5a of the fan control valve 5. Thus, the fan control valve 5 is switched to the normal rotation position (5F), and the hydraulic operating fluid delivered from the first hydraulic pump 2 rotates the fan motor 8 in the normal rotation direction.

When the processing of step S130 is ended, the processing proceeds to a next step S140. In step S140, the controller 50 determines whether the cooling water temperature Tc obtained in step S110 is equal to or higher than the second threshold value Tc2. When it is determined in step S140 that the cooling water temperature Tc is equal to or higher than the second threshold value Tc2, the processing proceeds to step S150. When it is determined in step S140 that the cooling water temperature Tc is lower than the second threshold value Tc2, the processing proceeds to step S155.

In step S150, the controller 50 outputs, to the regulator 2a, a control signal for setting the delivery capacity q of the first hydraulic pump 2 to the maximum capacity qmax. The controller 50 then ends the processing illustrated in the flowchart of FIG. 7 in the present control cycle. In step S155, the controller 50 determines a target value of the delivery capacity q of the first hydraulic pump 2 on the basis of the capacity control table (see FIG. 6) and the cooling water temperature Tc obtained in step S110. The controller 50 outputs, to the regulator 2a, a control signal for setting the delivery capacity q of the first hydraulic pump 2 to the target value corresponding to the cooling water temperature Tc. The controller 50 then ends the processing illustrated in the flowchart of FIG. 7 in the present control cycle.

As described above, when it is determined in step S120 that the cooling water temperature Tc is lower than the first threshold value Tc1, the processing proceeds to step S135. In step S135, the controller 50 outputs an OFF signal to the solenoid valves 16 and 17. When the OFF signals are input to the solenoid valves 16 and 17, the hydraulic pilot portions 5a and 5b of the fan control valve 5 are connected to the hydraulic operating fluid tank 22. Thus, the fan control valve 5 is switched to the neutral position (5N) by biasing forces of the centering springs.

When the processing of step S135 is ended, the processing proceeds to a next step S137. In step S137, the controller 50 outputs, to the regulator 2a, a control signal for setting the delivery capacity q of the first hydraulic pump 2 to the minimum capacity qmin. The controller 50 then ends the processing illustrated in the flowchart of FIG. 7 in the present control cycle.

Incidentally, though not illustrated in the figure, the controller 50 determines whether the operation device 91 is operated or not to the neutral position, and performs the control illustrated in the flowchart of FIG. 7 only when the operation device 91 is operated to the neutral position. That is, when the operation device 91 is not operated to the neutral position (that is, when the operation device 91 is operated to one of the raising position and the lowering position), the controller 50 controls the fan control valve 5 to the neutral position (5N) irrespective of the cooling water temperature Tc.

In addition, with reference to the flowchart of FIG. 7, description has been made of an example in which the processing of step S137 is performed when a negative determination is made in step S120, the processing of step S150 is performed when an affirmative determination is made in step S140, and the processing of step S155 is performed when a negative determination is made in step S140. However, the controller 50 may compute the target value of the delivery capacity q by using the capacity control table (see FIG. 6) also when the cooling water temperature Tc is lower than the first threshold value Tc1 and when the cooling water temperature Tc is equal to or higher than the second threshold value Tc2. For example, the processing of steps S137, S140, S150, and S155 may be omitted, and processing corresponding to step S155 may be performed between step S110 and step S120.

Referring to FIG. 8, description will be made of a main operation of the hydraulic system 110 when the dump truck 100 according to the present embodiment is travelling. Incidentally, during the travelling of the dump truck 100, the operation device 91 is operated to the neutral position, and therefore the hoist control valve 7 is retained in the neutral position (7N). FIG. 8 is a diagram illustrating relations of the switching position of the fan control valve 5 and the delivery flow rate Q of the first hydraulic pump 2 corresponding to the cooling water temperature Tc. When the cooling water temperature Tc is equal to or higher than the first threshold value Tc1 during the travelling of the dump truck 100, the controller 50 performs control to switch the fan control valve 5 to the normal rotation position (5F). That is, the controller 50 outputs an ON signal to the solenoid valve 16, and outputs an OFF signal to the solenoid valve 17. The fan control valve 5 is thereby switched to the normal rotation position (5F).

Here, the cooling water temperature Tc is decreased when the cooling air and the travelling wind continue to cool the engine cooling water flowing within the radiator 23 during unloaded travelling after a soil discharge operation for a transportation object such as soil is performed, for example. In a range in which the cooling water temperature Tc is equal to or higher than the first threshold value Tc1 and lower than the second threshold value Tc2, the delivery capacity q of the first hydraulic pump 2 is controlled according to the cooling water temperature Tc. When the cooling water temperature Tc is further decreased, and the cooling water temperature Tc becomes lower than the first threshold value Tc1, the controller 50 outputs an OFF signal to each of the solenoid valve 16 and the solenoid valve 17. The fan control valve 5 is thereby switched to the neutral position (5N). Hence, the rotation of the cooling fan 9 decelerates with the passage of time, and stops. Because the generation of the cooling air by the cooling fan 9 is stopped, an overcooling of the engine cooling water can be prevented. In addition, the controller 50 controls the delivery flow rate Q of the first hydraulic pump 2 to the minimum flow rate Qmin. Thus, the hydraulic operating fluid delivered from the first hydraulic pump 2 is discharged into the hydraulic operating fluid tank 22 through the fan control valve 5 in the neutral position (5N) and the hoist control valve 7 in the neutral position (7N). Hence, it is possible to reduce a pressure loss in the center bypass line CL connecting the first hydraulic pump 2 and the hydraulic operating fluid tank 22 to each other, and reduce the delivery pressure of the first hydraulic pump 2. As a result, a load on the first hydraulic pump 2 is reduced, and therefore a load on the engine 1 is decreased. Hence, the present embodiment can reduce an energy loss of the first hydraulic pump 2, and therefore reduce fuel consumption.

The first embodiment described above produces the following actions and effects.

(1) The fan control valve 5 and the hoist control valve (cylinder control valve) 7 are connected in tandem to the center bypass line (hydraulic fluid line) CL connecting the first hydraulic pump 2 and the hydraulic operating fluid tank 22 to each other, and the fan control valve 5 is disposed on an upstream side of the hoist control valve 7. The fan control valve 5 has the neutral position (5N) that makes the first hydraulic pump (hydraulic pump) 2 and the hoist control valve 7 communicate with each other, interrupts communication between the first hydraulic pump 2 and the fan motor (hydraulic motor) 8, and makes the suction port and the delivery port of the fan motor 8 and the hydraulic operating fluid tank 22 communicate with each other via the communication line 5c, and the normal rotation position (5F) and the reverse rotation position (5R) as a rotation position that interrupts the communication between the first hydraulic pump 2 and the hoist control valve 7, makes the first hydraulic pump 2 and the suction port of the fan motor 8 communicate with each other, and makes the delivery port of the fan motor 8 and the hydraulic operating fluid tank 22 communicate with each other. The controller 50 determines whether the cooling water temperature (temperature of the cooling object) Tc sensed by the temperature sensor 25 is equal to or higher than the first threshold value Tc1. The controller 50 switches the fan control valve 5 to the normal rotation position (5F) and controls the delivery capacity q of the first hydraulic pump 2 to a delivery capacity higher than the minimum capacity qmin when the cooling water temperature Tc is equal to or higher than the first threshold value Tc1. The controller 50 switches the fan control valve 5 to the neutral position (5N) and controls the delivery capacity q of the first hydraulic pump 2 to the minimum capacity qmin when the cooling water temperature Tc is lower than the first threshold value Tc1.

The dump truck 100 according to the present embodiment uses the hoist cylinder 10 with a low frequency. Thus, the hydraulic pump (first hydraulic pump 2) that supplies the hydraulic operating fluid to the hoist cylinder 10 and the fan motor 8 is shared therebetween. In addition, the fan control valve 5 as a single control valve combines a function of switching a supply destination of the hydraulic operating fluid delivered from the first hydraulic pump 2 to the hoist cylinder (hydraulic cylinder) 10 or to the fan motor 8, and a function of switching the fan motor 8 between the rotation and stopping. Therefore, control valves for implementing the respective functions do not need to be provided separately, so that the configuration of a hydraulic circuit can be simplified. In addition, when a low-load travelling state is continued, and the cooling water temperature Tc has become lower than the first threshold value Tc1 due to the cooling air and the travelling wind, the fan control valve 5 is switched to the neutral position (5N). Thus, the generation of the cooling air by the cooling fan 9 is stopped, so that an overcooling of the engine cooling water can be prevented. That is, the present embodiment can provide the dump truck (transportation vehicle) 100 that can prevent an overcooling of the engine cooling water (cooling object) with a simple configuration. Incidentally, controlling the delivery capacity q of the first hydraulic pump 2 to the minimum capacity qmin reduces a load on the engine 1, and can therefore reduce fuel consumption.

(2) The controller 50 increases the delivery capacity q of the first hydraulic pump 2 as the cooling water temperature Tc rises when the cooling water temperature Tc is equal to or higher than the first threshold value Tc1 and lower than the second threshold value Tc2. In addition, the controller 50 controls the delivery capacity q of the first hydraulic pump 2 to the maximum capacity qmax when the cooling water temperature Tc is equal to or higher than the second threshold value Tc2.

According to this configuration, as the cooling water temperature Tc rises, the rotational speed of the cooling fan 9 is raised, and thereby a cooling effect on the engine cooling water can be enhanced. Controlling the rotational speed of the cooling fan 9 according to the cooling water temperature Tc can inhibit the engine cooling water from becoming too low or too high.

(3) The fan control valve 5 has, as a rotation position, the normal rotation position (5F) for rotating the fan motor 8 in the normal rotation direction and the reverse rotation position (5R) for rotating the fan motor 8 in the reverse rotation direction opposite from the normal rotation direction. When the fan control valve 5 is switched to the reverse rotation position (5R), a cooling air flowing in a forward direction from the cooling fan 9 is generated, and removes dust adhering to a filter for the air holes of the front grille 107, clearances in the radiator (heat exchanger) 23, and the like. Hence, the present embodiment can easily recover the cooling performance of the radiator 23 which cooling performance is decreased by the dust.

Incidentally, the controller 50 can be configured to temporarily switch the fan control valve 5 to the reverse rotation position (5R) at a time of maintenance of the dump truck 100 or on a periodic basis, for example. When an input device is operated by a serviceperson at the time of the maintenance, and a reverse rotation command for the cooling fan 9 is input from the input device to the controller 50, the controller 50 switches the fan control valve 5 to the reverse rotation position (5R) only for a predetermined time. In addition, the controller 50 measures an operation time of the dump truck 100 by a timer function, and switches the fan control valve 5 to the reverse rotation position (5R) only for a predetermined time each time the operation time exceeds a predetermined operation time. Incidentally, the controller 50 may temporarily switch the fan control valve 5 to the reverse rotation position (5R) at a time of starting the engine 1 or at a time of stopping the engine 1.

(4) The hydraulic system 110 includes the pair of motor hydraulic fluid lines 81 and 82 connecting the fan control valve 5 and the fan motor 8 to each other, and the pair of check valves 13 and 14 provided between the pair of motor hydraulic fluid lines 81 and 82 and the hydraulic operating fluid tank 22. With this configuration, when the cooling fan 9 is rotated by the travelling wind, for example, in a state in which the fan control valve 5 is switched to the neutral position (5N), the hydraulic operating fluid is resupplied from the hydraulic operating fluid tank 22 to the suction port of the fan motor 8 through the check valves 13 and 14, and the hydraulic operating fluid is resupplied from the hydraulic operating fluid tank 22 to the suction port of the fan motor 8 through the fan control valve 5. Hence, it is possible to suppress a negative pressure at the suction port of the fan motor 8, and thereby prevent the occurrence of cavitation. That is, damage to the fan motor 8 due to cavitation can be prevented. Because the hydraulic operating fluid is resupplied from the hydraulic operating fluid tank 22 to the suction port of the fan motor 8 through not only the check valves 13 and 14 but also the fan control valve 5, the occurrence of cavitation can be prevented effectively as compared with a case where the hydraulic operating fluid is resupplied through only the check valves 13 and 14. Incidentally, the same is true for a case where the fan control valve 5 is switched to the neutral position (5N) while the cooling fan 9 is rotating normally or rotating reversely, and the cooling fan 9 continues to rotate by inertia. That is, when the cooling fan 9 rotates by inertia, the hydraulic operating fluid is resupplied from the hydraulic operating fluid tank 22 to the suction port of the fan motor 8 through the communication line 5c of the fan control valve 5 and the check valve 13 or the check valve 14. It is therefore possible to suppress a negative pressure on the suction side of the fan motor 8.

In addition, in a state in which the spool of the fan control valve 5 is in the neutral position (5N), the motor hydraulic fluid line 81 and the motor hydraulic fluid line 82 communicate with each other. That is, the fan control valve 5 according to the present embodiment is a directional control valve of what is called a neutral free type. Therefore, the hydraulic operating fluid in the motor hydraulic fluid line on the delivery side is also supplied to the motor hydraulic fluid line on the suction side through the fan control valve 5. Hence, the present embodiment can prevent the occurrence of cavitation effectively as compared with a case where the pair of motor hydraulic fluid lines 81 and 82 is not made to communicate with each other in the neutral position (5N) (case where a directional control valve of a neutral blocking type is included).

Second Embodiment

A transportation vehicle according to a second embodiment of the present invention will be described with reference to drawings. Incidentally, configurations identical or corresponding to the configurations described in the first embodiment are identified by the same reference symbols, and differences will be mainly described.

With an objective of reductions in size and cost of a hydraulic pump for driving a hydraulic actuator, a transportation vehicle may include: the hydraulic pump that supplies a hydraulic operating fluid to the hydraulic actuator (a hoist cylinder and a steering cylinder); a fan pump that supplies the hydraulic operating fluid to a fan motor; and a confluence control valve (circuit selector valve) that connects a delivery portion of the fan pump so as to switch between the hydraulic actuator and the fan motor.

A load on the transportation vehicle at a time of travelling changes according to the presence or absence of a cargo, a road gradient, and the like. For example, unloaded travelling, level ground travelling, and the like are low-load travelling states as compared with cargo travelling, uphill travelling, and the like. In a low-load travelling state, the cooling of the cooling object by a cooling fan may be unnecessary. When the delivery portion of the fan pump and a hydraulic circuit for steering driving are connected to each other by switching the confluence control valve (circuit selector valve) in order to stop the cooling fan, an operating pressure of the steering cylinder with a high operation frequency acts on the fan pump during travelling. As a result, a load on the fan pump increases, and an energy loss occurs. There is thus a desire for a transportation vehicle that can suppress the occurrence of an energy loss at a time of stopping the cooling fan.

A hydraulic system 110 of a dump truck 100 according to the second embodiment will be described with reference to FIG. 9. As illustrated in FIG. 9, the hydraulic system 110 of the dump truck 100 according to the second embodiment includes: a first hydraulic pump 2 and a second hydraulic pump 3 of the variable displacement type as well as a pilot pump 4, the pumps 2 to 4 being driven by an engine 1; a pair of hoist cylinders (only one hoist cylinder is illustrated in FIG. 9) 10 that are extendably and contractably provided between a bed 104 and a vehicle body 101, and are driven by a hydraulic operating fluid supplied from the first hydraulic pump 2; a fan motor 8 that is driven by the hydraulic operating fluid supplied from the first hydraulic pump 2; a steering circuit 33 having a pair of left and right steering cylinders 34 and 35 that are driven by the hydraulic operating fluid supplied from the second hydraulic pump 3; a hydraulic operating fluid tank 22 that stores the hydraulic operating fluid; a fan control valve 5, a confluence control valve 6, and a hoist control valve 7 that are provided on a center bypass line CL as a hydraulic fluid line that connects the first hydraulic pump 2 and the hydraulic operating fluid tank 22 to each other; and a controller 50 that controls various parts of the dump truck 100. Incidentally, a relation between the delivery capacity q and the delivery flow rate Q of the second hydraulic pump 3 is similar to the relation between the delivery capacity q and the delivery flow rate Q of the first hydraulic pump 2 (see FIG. 5), and therefore description thereof will be omitted.

The first hydraulic pump 2 and the second hydraulic pump 3 suck in the hydraulic operating fluid from the hydraulic operating fluid tank 22 and deliver a high-pressure hydraulic operating fluid (pressurized fluid), by being driven by the engine 1. A delivery port of the first hydraulic pump 2 is connected to the hydraulic operating fluid tank 22 via the center bypass line CL. The fan control valve 5, the confluence control valve 6, and the hoist control valve 7 are connected in tandem with each other along the center bypass line CL. The fan control valve 5 controls a flow of the hydraulic operating fluid supplied from the first hydraulic pump 2 to the fan motor 8 and a flow of the hydraulic operating fluid discharged from the fan motor 8 to the hydraulic operating fluid tank 22. The hoist control valve 7 controls a flow of the hydraulic operating fluid supplied from the first hydraulic pump 2 to the hoist cylinder 10 and a flow of the hydraulic operating fluid discharged from the hoist cylinder 10 to the hydraulic operating fluid tank 22. The confluence control valve 6 functions as a circuit selector valve that selects a circuit as a supply destination of the hydraulic operating fluid delivered from the second hydraulic pump 3.

The fan control valve 5 is connected with a supply hydraulic fluid line 61 that branches from the center bypass line CL. The confluence control valve 6 is provided on a downstream side of the fan control valve 5 on the center bypass line CL. The confluence control valve 6 is connected with a supply hydraulic fluid line 63 extending from a delivery port of the second hydraulic pump 3. The hoist control valve 7 is provided on a downstream side of the confluence control valve 6 on the center bypass line CL. The hoist control valve 7 is connected with a supply hydraulic fluid line 62 that branches from the center bypass line CL. A return oil from the fan motor 8 is discharged into the hydraulic operating fluid tank 22 through a return hydraulic fluid line 68. A return oil from the hoist cylinder 10 is discharged into the hydraulic operating fluid tank 22 through a return hydraulic fluid line 69.

The steering circuit 33 includes: a pair of left and right steering cylinders 34 and 35; a steering control valve 31 that controls a flow of the hydraulic operating fluid supplied from the second hydraulic pump 3 to the steering cylinders 34 and 35; steering hydraulic fluid lines 36 and 37 that connect the steering cylinders 34 and 35 to the steering control valve 31; a high pressure side hydraulic fluid line 38 that connects the second hydraulic pump 3 and the steering control valve 31 to each other; and a low pressure side hydraulic fluid line 39 that connects the steering control valve 31 and the hydraulic operating fluid tank 22 to each other. Front wheels 105 (see FIG. 1) constitute steered wheels to be steered by the operator of the dump truck 100 (steering operation). The front wheels 105 are steered with extending and contracting operations of the left and right steering cylinders 34 and 35 when the operator of the dump truck 100 operates a steering wheel 29 for steering.

The left and right steering cylinders 34 and 35 steer the left and right front wheels 105 by extending and contracting according to the operation of the steering wheel 29. The steering cylinder 34 on the left side is a hydraulic cylinder having a bottom side oil chamber 34*a* and a rod side oil chamber 34b. The steering cylinder 35 on the right side is a hydraulic cylinder having a bottom side oil chamber 35a and a rod side oil chamber 35b. The bottom side oil chamber 35a of the steering cylinder 35 on the right side and the rod side oil chamber 34b of the steering cylinder 34 on the left side are connected to each other via the steering hydraulic fluid line 36. The bottom side oil chamber 34a of the steering cylinder 34 on the left side and the rod side oil chamber 35b of the steering cylinder 35 on the right side are connected to each other via the steering hydraulic fluid line 37. The steering hydraulic fluid lines 36 and 37 are connected to the high pressure side hydraulic fluid line 38 and the low pressure side hydraulic fluid line 39 via the steering control valve 31.

The steering wheel 29 is provided within a cab 103. The steering wheel 29 is rotationally operated in a left and a right direction by the operator, and thereby controls a travelling direction of the dump truck 100. A hydraulic motor 30 is coupled to a steering shaft of the steering wheel 29. A rotation of the hydraulic motor 30 reduces an operating force on the steering wheel 29.

An accumulator 42 is connected to the high pressure side hydraulic fluid line 38. The accumulator 42 accumulates the hydraulic operating fluid (pressurized fluid) delivered from the second hydraulic pump 3. A relief valve 32 that defines a maximum pressure of the high pressure side hydraulic fluid line 38 is provided between the high pressure side hydraulic fluid line 38 and the low pressure side hydraulic fluid line 39. Hence, the accumulator 42 and the relief valve 32 maintain the high pressure side hydraulic fluid line 38 at a predetermined pressure. Thus, at a time of an operation of the steering wheel 29, the steering cylinders 34 and 35 can be driven appropriately, and the vehicle body 101 can be turned in an optional direction. Incidentally, the accumulator 42 also functions as a temporary hydraulic fluid source for the left and right steering cylinders 34 and 35. That is, when the hydraulic operating fluid is not supplied from the second hydraulic pump 3 to the supply hydraulic fluid line 63 due to a failure in the second hydraulic pump 3 or the like, the pressurized fluid accumulated in the accumulator 42 is supplied to the left and right steering cylinders 34 and 35.

When the operator rotationally operates the steering wheel 29, the steering control valve 31 is switched to one of a left and a right steering position (31L) and (31R) from a neutral position (31N). Thus, the hydraulic operating fluid supplied from the second hydraulic pump 3 is supplied to the left and right steering cylinders 34 and 35 through the steering control valve 31, so that one of the steering cylinders 34 and 35 extends, and the other contracts. The left and right front wheels 105 of the dump truck 100 are thereby steered according to the rotational operation of the steering wheel 29.

The fan control valve 5 is constituted by, for example, a six-port three-position hydraulic pilot type directional control valve. The fan control valve 5 is formed by using a single directional control valve, and has hydraulic pilot portions 5a and 5b on both of a left side and a right side thereof.

The fan control valve 5 is a selector valve in which a spool (valve disc) can be switched to a normal rotation position (5F), a reverse rotation position (5R), and a neutral position (5N). During a normal time, both of the hydraulic pilot portions 5a and 5b of the fan control valve 5 are connected to the hydraulic operating fluid tank 22, and the spool of the fan control valve 5 is retained in the neutral position (5N) by centering springs.

When the spool of the fan control valve 5 is in the neutral position (5N), an upstream side and a downstream side of the fan control valve 5 in the center bypass line CL communicate with each other, and communication of the supply hydraulic fluid line 61 with motor hydraulic fluid lines 81 and 82 is interrupted. That is, in the neutral position (5N), the first hydraulic pump 2 and the confluence control valve 6 communicate with each other, and communication between the first hydraulic pump 2 and the fan motor 8 is interrupted. The hydraulic operating fluid delivered from the first hydraulic pump 2 is thereby supplied to the confluence control valve 6 through the fan control valve 5. In addition, when the spool of the fan control valve 5 is in the neutral position (5N), a communication line 5c of the fan control valve 5 connects the pair of motor hydraulic fluid lines 81 and 82 to each other, and connects the pair of motor hydraulic fluid lines 81 and 82 to the return hydraulic fluid line 68. In the neutral position (5N), the suction port and the delivery port of the fan motor 8 and the hydraulic operating fluid tank 22 communicate with each other via the communication line 5c, so that rotation of the cooling fan 9 by an external force is allowed.

When the spool of the fan control valve 5 is in the normal rotation position (5F), the supply hydraulic fluid line 61 and the motor hydraulic fluid line 81 communicate with each other, and the motor hydraulic fluid line 82 and the return hydraulic fluid line 68 communicate with each other. That is, in the normal rotation position (5F), the communication between the suction port and the delivery port of the fan motor 8 and the hydraulic operating fluid tank 22 via the communication line 5c is interrupted, the suction port of the fan motor 8 and the first hydraulic pump 2 communicate with each other, and the delivery port of the fan motor 8 and the hydraulic operating fluid tank 22 communicate with each other. Thus, the hydraulic operating fluid delivered from the first hydraulic pump 2 is supplied to the fan motor 8 through the supply hydraulic fluid line 61 and the motor hydraulic fluid line 81, so that the fan motor 8 rotates in a normal rotation direction. The hydraulic operating fluid discharged from the fan motor 8 is discharged into the hydraulic operating fluid tank 22 through the motor hydraulic fluid line 82 and the return hydraulic fluid line 68. When the spool of the fan control valve 5 is in the reverse rotation position (5R), the supply hydraulic fluid line 61 and the motor hydraulic fluid line 82 communicate with each other, and the motor hydraulic fluid line 81 and the return hydraulic fluid line 68 communicate with each other. That is, in the reverse rotation position (5R), the communication between the suction port and the delivery port of the fan motor 8 and the hydraulic operating fluid tank 22 via the communication line 5c is interrupted, the suction port of the fan motor 8 and the first hydraulic pump 2 communicate with each other, and the delivery port of the fan motor 8 and the hydraulic operating fluid tank 22 communicate with each other. Thus, the hydraulic operating fluid delivered from the first hydraulic pump 2 is supplied to the fan motor 8 through the supply hydraulic fluid line 61 and the motor hydraulic fluid line 82, so that the fan motor 8 rotates in a reverse rotation direction as a direction opposite from the normal rotation direction. The hydraulic operating fluid discharged from the fan motor 8 is discharged into the hydraulic operating fluid tank 22 through the motor hydraulic fluid line 81 and the return hydraulic fluid line 68.

Thus, the normal rotation position (5F) and the reverse rotation position (5R) are rotation positions at which the first hydraulic pump 2 and the fan motor 8 are made to communicate with each other, and the fan motor 8 is rotated by the hydraulic operating fluid delivered from the first hydraulic pump 2. Incidentally, when the spool of the fan control valve 5 is in a rotation position (5F) or (5R), the communication between the first hydraulic pump 2 and the confluence control valve 6 via the center bypass line CL is interrupted.

The confluence control valve 6 is constituted by, for example, a six-port three-position hydraulic pilot type directional control valve. The confluence control valve 6 is formed by using a single directional control valve, and has hydraulic pilot portions 6a and 6b on both of a left side and a right side thereof.

The confluence control valve 6 is a selector valve in which a spool (valve disc) can be switched to a confluence position (6C), a flow dividing position (6D), and a neutral position (6N). During a normal time, both of the hydraulic pilot portions 6a and 6b of the confluence control valve 6 are connected to the hydraulic operating fluid tank 22, and the spool of the confluence control valve 6 is retained in the neutral position (6N) by centering springs.

When the spool of the confluence control valve 6 is in the confluence position (6C), the supply hydraulic fluid line 63 and the center bypass line CL communicate with each other, and communication between the supply hydraulic fluid line 63 and the high pressure side hydraulic fluid line 38 of the steering circuit 33 is interrupted. Hence, when the confluence control valve 6 is in the confluence position (6C), the first hydraulic pump 2 and the hoist control valve 7 communicate with each other via the fan control valve 5 in the neutral position (5N), the second hydraulic pump 3 and the hoist control valve 7 communicate with each other, and communication between the second hydraulic pump 3 and the steering circuit 33 is interrupted. Thus, when the confluence control valve 6 is in the confluence position (6C) and the fan control valve 5 is in the neutral position (5N), the hydraulic operating fluid delivered from the first hydraulic pump 2 and the hydraulic operating fluid delivered from the second hydraulic pump 3 merge with each other, and are introduced into the hoist control valve 7.

When the spool of the confluence control valve 6 is in the neutral position (6N), the supply hydraulic fluid line 63 and the high pressure side hydraulic fluid line 38 of the steering circuit 33 communicate with each other. In addition, when the spool of the confluence control valve 6 is in the neutral position (6N), an upstream side and a downstream side of the confluence control valve 6 in the center bypass line CL communicate with each other. That is, in the neutral position (6N), the fan control valve 5 and the hoist control valve 7 communicate with each other. Hence, when the confluence control valve 6 is in the neutral position (6N), the first hydraulic pump 2 and the hoist control valve 7 communicate with each other via the fan control valve 5 in the neutral position (5N), the second hydraulic pump 3 and the steering circuit 33 communicate with each other, and the communication between the second hydraulic pump 3 and the hoist control valve 7 is interrupted. Thus, when the confluence control valve 6 is in the neutral position (6N) and the fan control valve 5 is in the neutral position (5N), the hydraulic operating fluid delivered from the first hydraulic pump 2 is introduced into the hoist control valve 7 through the fan control valve 5 and the confluence control valve 6, and the hydraulic operating fluid delivered from the second hydraulic pump 3 is introduced into the steering circuit 33. That is, the neutral position (6N) is a non-confluence position that does not cause the hydraulic operating fluid delivered from the first hydraulic pump 2 and the hydraulic operating fluid delivered from the second hydraulic pump 3 to merge with each other.

When the spool of the confluence control valve 6 is in the flow dividing position (6D), the supply hydraulic fluid line 63 communicates with the high pressure side hydraulic fluid line 38 of the steering circuit 33 and an actuator hydraulic fluid line 85. Thus, the hydraulic operating fluid delivered from the second hydraulic pump 3 is divided and introduced into the steering circuit 33 and the actuator hydraulic fluid line 85. An attachment actuator 86 connected to the actuator hydraulic fluid line 85 therefore becomes operable during travelling. Incidentally, as with the neutral position (6N), the flow dividing position (6D) is a non-confluence position that does not cause the hydraulic operating fluid delivered from the first hydraulic pump 2 and the hydraulic operating fluid delivered from the second hydraulic pump 3 to merge with each other.

The hoist control valve 7 is constituted by, for example, a six-port four-position hydraulic pilot type directional control valve. The hoist control valve 7 is formed by using a single directional control valve, and has hydraulic pilot portions 7a and 7b on both of a left side and a right side thereof.

The hoist control valve 7 has, as a plurality of switching positions, a raising position (7R) at which the hoist cylinder 10 is extended by supplying and discharging the hydraulic operating fluid, and the bed 104 is thereby rotated upward, a lowering position (7L) at which the hoist cylinder 10 is contracted by supplying and discharging the hydraulic operating fluid, and thereby the bed 104 is rotated downward, a floating position (7F) that lets the bed 104 contract the hoist cylinder 10 under the own weight of the bed 104 and thus allows the bed 104 to fall under the own weight thereof, and a neutral position (7N) at which the bed 104 is retained by stopping the supply and discharge of the hydraulic operating fluid. The hoist control valve 7 is a selector valve that can switch a spool (valve disc) thereof to the raising position (7R), the lowering position (7L), the floating position (7F), and the neutral position (7N). During a normal time, both of the hydraulic pilot portions 7a and 7b of the hoist control valve 7 are connected to the hydraulic operating fluid tank 22, and the spool of the hoist control valve 7 is retained in the neutral position (7N) by centering springs.

When the spool of the hoist control valve 7 is in the neutral position (7N), communication between the supply hydraulic fluid line 62 and the return hydraulic fluid line 69 and actuator hydraulic fluid lines 71 and 72 is interrupted. This stops the supply of the hydraulic operating fluid to the hoist cylinder 10 and the discharge of the hydraulic operating fluid from the hoist cylinder 10. The movement of the hoist cylinder 10 is therefore stopped. In addition, when the spool of the hoist control valve 7 is in the neutral position (7N), an upstream side and a downstream side of the hoist control valve 7 in the center bypass line CL communicate with each other.

When the spool of the hoist control valve 7 is in the raising position (7R), the supply hydraulic fluid line 62 and the actuator hydraulic fluid line 71 communicate with each other, and the actuator hydraulic fluid line 72 and the return hydraulic fluid line 69 communicate with each other. Incidentally, the communication between the upstream side and the downstream side of the hoist control valve 7 in the center bypass line CL is interrupted. Thus, when the fan control valve 5 is in the neutral position (5N), the hydraulic operating fluid delivered from the first hydraulic pump 2 is supplied to the bottom side oil chamber 10d of the hoist cylinder 10 through the supply hydraulic fluid line 62 and the actuator hydraulic fluid line 71. In addition, the hydraulic operating fluid within the rod side oil chamber 10e is discharged into the hydraulic operating fluid tank 22 through the actuator hydraulic fluid line 72 and the return hydraulic fluid line 69. The hoist cylinder 10 is thereby driven in an extending direction, that is, in a direction of raising the bed 104.

When the spool of the hoist control valve 7 is in the lowering position (7L), the supply hydraulic fluid line 62 and the actuator hydraulic fluid line 72 communicate with each other, and the actuator hydraulic fluid line 71 and the return hydraulic fluid line 69 communicate with each other. Incidentally, the communication between the upstream side and the downstream side of the hoist control valve 7 in the center bypass line CL is interrupted. Thus, when the fan control valve 5 is in the neutral position (5N), the hydraulic operating fluid delivered from the first hydraulic pump 2 is supplied to the rod side oil chamber 10e of the hoist cylinder 10 through the supply hydraulic fluid line 62 and the actuator hydraulic fluid line 72. In addition, the hydraulic operating fluid within the bottom side oil chamber 10d is discharged into the hydraulic operating fluid tank 22 through the actuator hydraulic fluid line 71 and the return hydraulic fluid line 69. The hoist cylinder 10 is thereby driven in a contracting direction, that is, in a direction of lowering the bed 104.

When the spool of the hoist control valve 7 is in the floating position (7F), the supply hydraulic fluid line 62 and the center bypass line CL on the downstream side of the hoist control valve 7 communicate with each other. In addition, when the spool of the hoist control valve 7 is in the floating position (7F), the actuator hydraulic fluid line 71 and the return hydraulic fluid line 69 communicate with each other. Thus, the hydraulic operating fluid within the bottom side oil chamber 10d of the hoist cylinder 10 is discharged into the hydraulic operating fluid tank 22, and the hydraulic operating fluid within the hydraulic operating fluid tank 22 is resupplied to the inside of the rod side oil chamber 10e of the hoist cylinder 10 via a hydraulic fluid line not illustrated. Hence, when the hoist control valve 7 is in the floating position (7F), the hoist cylinder 10 can contract due to the own weight of the bed 104 side.

The pilot pump 4 is connected to a plurality of solenoid valves 16 to 21 via a pilot hydraulic fluid line. The pilot hydraulic fluid line between the pilot pump 4 and the plurality of solenoid valves 16 to 21 is provided with a pilot relief valve 15 that defines the pressure of the pilot hydraulic fluid line. The plurality of solenoid valves 16 to 21 are a pressure reducing valve that reduces the pressure of the pilot hydraulic fluid line (primary pressure) according to a control current from the controller 50, and outputs a pressure after the pressure reduction (secondary pressure) as a pilot pressure. When a control current for standby as an OFF signal is input to the solenoid valves 16 to 21, the solenoid valves 16 to 21 make the hydraulic pilot portions 5a, 5b, 6a, 6b, 7a, and 7b communicate with the hydraulic operating fluid tank 22. When a control current for driving as an ON signal is input to the solenoid valves 16 to 21, the solenoid valves 16 to 21 output generated pilot pressures to the hydraulic pilot portions 5a, 5b, 6a, 6b, 7a, and 7b.

The solenoid valves 16 and 17 for driving the fan control valve 5 operate in response to a control command (control current) output from the controller 50 so as to correspond to the temperature of the engine cooling water. The solenoid valves 18 and 19 for driving the hoist control valve 7 operate in response to a control command (control current) output from the controller 50 so as to correspond to operation of an operation device 91 for the bed. The solenoid valves 20 and 21 for driving the confluence control valve 6 operate in response to a control command (control current) output from the controller 50 so as to correspond to operation of the operation device 91 for the bed and an operation device of the attachment actuator 86 which operation device is not illustrated.

An input-output interface of the controller 50 is connected with the operation device 91 for performing switching operation of the hoist control valve 7, that is, operation of the hoist cylinder 10. The operation device 91 is constituted by an electric lever device, for example, and has an operation lever 91a that is manually tilted by the operator within the cab 103. The operation device 91 is operated to any one of a neutral position, a raising position, a floating position, and a lowering position corresponding to the respective switching positions of the hoist control valve 7, that is, the neutral position (7N), the raising position (7R), the floating position (7F), and the lowering position (7L). The operation device 91 outputs an operation signal corresponding to an operation position to the controller 50.

An input unit of the input-output interface converts signals input from various kinds of devices (the operation device 91, the temperature sensor 25, and the like) into data that can be subjected to computation by the processing device 51. In addition, an output unit of the input-output interface generates signals for output according to results of computation in the processing device 51, and outputs the signals to various kinds of devices (the solenoid valves 16 to 21, regulators 2a and 3a, and the like).

The controller 50 outputs a control signal to the regulator 2a of the first hydraulic pump 2 and the regulator 3a of the second hydraulic pump 3. The regulator 2a is a capacity control system that variably controls the displacement volume (delivery capacity per rotation) of the first hydraulic pump 2. The regulator 3a is a capacity control system that variably controls the displacement volume (delivery capacity per rotation) of the second hydraulic pump 3. When the hydraulic pumps are a swash plate type piston pump, for example, the regulator includes: a tilting actuator that controls the tilting angle (displacement volume) of a swash plate of the hydraulic pump; and a solenoid proportional valve that generates a control pressure of the tilting actuator with a delivery pressure of the hydraulic pump as a source pressure.

The controller 50 controls the fan control valve 5, when the operation device 91 is operated to the neutral position, on the basis of a temperature Tc of the engine cooling water (which temperature will hereinafter be described also as a cooling water temperature) sensed by the temperature sensor 25. Details of control of the fan control valve 5 will be described later.

The controller 50 retains the hoist control valve 7 in the neutral position (7N) when the operation device 91 is operated to the neutral position. That is, the controller 50 outputs an OFF signal to both of the solenoid valves 18 and 19. When the operation device 91 is operated to the floating position, the controller 50 performs control to switch the hoist control valve 7 to the floating position (7F). That is, the controller 50 outputs an OFF signal to the solenoid valve 18, and outputs a first ON signal to the solenoid valve 19. Thus, a pilot pressure generated by the solenoid valve 19 acts on the hydraulic pilot portion 7b to switch the hoist control valve 7 to the floating position (7F).

The controller 50 performs control to switch the hoist control valve 7 to the raising position (7R) when the operation device 91 is operated to the raising position. That is, the controller 50 outputs an ON signal to the solenoid valve 18, and outputs an OFF signal to the solenoid valve 19.

Thus, a pilot pressure generated by the solenoid valve 18 acts on the hydraulic pilot portion 7a to switch the hoist control valve 7 to the raising position (7R). When the operation device 91 is operated to the lowering position, the controller 50 performs control to switch the hoist control valve 7 to the lowering position (7L). That is, the controller 50 outputs an OFF signal to the solenoid valve 18, and outputs a second ON signal to the solenoid valve 19. The second ON signal has a larger current value than the first signal. Thus, a pilot pressure generated by the solenoid valve 19 acts on the hydraulic pilot portion 7b to switch the hoist control valve 7 to the lowering position (7L).

The controller 50 performs control to switch the confluence control valve 6 to the confluence position (6C) when the operation device 91 is operated to the raising position. That is, the controller 50 outputs an ON signal to the solenoid valve 20, and outputs an OFF signal to the solenoid valve 21. Thus, a pilot pressure generated by the solenoid valve 20 acts on the hydraulic pilot portion 6a to switch the confluence control valve 6 to the confluence position (6C).

Hence, when the operation device 91 is operated to the raising position, the hydraulic operating fluids delivered from both of the first hydraulic pump 2 and the second hydraulic pump 3 are supplied to the hoist cylinder 10. Thus, the hoist cylinder 10 having a high capacity can be smoothly extended to discharge a cargo such as soil from the bed 104. According to the present embodiment, the first hydraulic pump 2 can be miniaturized as compared with a configuration in which an extending operation of the hoist cylinder 10 is performed by using only the hydraulic operating fluid delivered from the first hydraulic pump 2.

Incidentally, when the operation device (not illustrated) of the attachment actuator 86 is operated, the controller 50 performs control to switch the confluence control valve 6 to the flow dividing position (6D). In addition, the controller 50 retains the confluence control valve 6 in the neutral position (6N) when the operation device 91 is operated to any one of the neutral position, the floating position, and the lowering position and the operation device of the attachment actuator 86 is not operated.

The controller 50 controls rotation and stopping of the fan motor 8 and a rotational direction of the fan motor 8 by controlling a switching position of the fan control valve 5, on the basis of the cooling water temperature Tc, for example. In addition, the controller 50 controls a rotational speed of the fan motor 8 by controlling a delivery capacity q of the first hydraulic pump 2 in a range from a minimum capacity $q_{min}$ to a maximum capacity $q_{max}$ via the regulator 2a, on the basis of the cooling water temperature Tc, for example.

Incidentally, the controller 50 controls a delivery capacity q of the second hydraulic pump 3 in a range from a minimum capacity $q_{min}$ to a maximum capacity $q_{max}$ via the regulator 3a on the basis of the pressure of the accumulator 42 sensed by a pressure sensor (not illustrated), for example. The minimum capacity $q_{min}$ and the maximum capacity $q_{max}$ of the delivery capacity q of the second hydraulic pump 3 may be set to be values different from those of the first hydraulic pump 2, or may be set to be the same values as those of the first hydraulic pump 2.

Functions of the controller 50 according to the second embodiment and the processing of fan control performed by the controller 50 are similar to those of the first embodiment. Incidentally, though not illustrated in the figure, the controller 50 determines whether the operation device 91 is operated or not to the neutral position or the floating position, and performs the control illustrated in the flowchart of FIG. 7 when the operation device 91 is operated to the neutral position or the floating position. When the operation device 91 is operated to the raising position or the lowering position, the controller 50 controls the fan control valve 5 to the neutral position (5N) irrespective of the cooling water temperature Tc. That is, when the operation device 91 is operated to the raising position or the lowering position, the controller 50 gives priority to the operation of the hoist cylinder 10.

Referring to FIG. 8, description will be made of a main operation of the hydraulic system 110 when the dump truck 100 according to the present second embodiment is travelling. Incidentally, during the travelling of the dump truck 100, the operation device 91 is operated to the neutral position, and therefore the hoist control valve 7 is retained in the neutral position (7N). In addition, the confluence control valve 6 is in the neutral position (6N) or the flow dividing position (6D). FIG. 8 is a diagram illustrating relations of the switching position of the fan control valve 5 and the delivery flow rate Q of the first hydraulic pump 2 corresponding to the cooling water temperature Tc. When the cooling water temperature Tc is equal to or higher than the first threshold value Tc1 during the travelling of the dump truck 100, the controller 50 performs control to switch the fan control valve 5 to the normal rotation position (5F). That is, the controller 50 outputs an ON signal to the solenoid valve 16, and outputs an OFF signal to the solenoid valve 17. The fan control valve 5 is thereby switched to the normal rotation position (5F).

Here, the cooling water temperature Tc is decreased when the cooling air and the travelling wind continue to cool the engine cooling water flowing within the radiator 23 during unloaded travelling after a soil discharge operation for a transportation object such as soil is performed, for example. In a range in which the cooling water temperature Tc is equal to or higher than the first threshold value Tc1 and lower than the second threshold value Tc2, the delivery capacity q of the first hydraulic pump 2 is controlled according to the cooling water temperature Tc. When the cooling water temperature Tc is further decreased, and the cooling water temperature Tc becomes lower than the first threshold value Tc1, the controller 50 outputs an OFF signal to each of the solenoid valve 16 and the solenoid valve 17. The fan control valve 5 is thereby switched to the neutral position (5N). Hence, the rotation of the cooling fan 9 decelerates with the passage of time, and stops. Because the generation of the cooling air by the cooling fan 9 is stopped, an overcooling of the engine cooling water can be prevented. In addition, the controller 50 controls the delivery flow rate Q of the first hydraulic pump 2 to the minimum flow rate Qmin. Thus, the hydraulic operating fluid delivered from the first hydraulic pump 2 is discharged into the hydraulic operating fluid tank 22 through the fan control valve 5 in the neutral position (5N), the confluence control valve 6 in the neutral position (6N) or the flow dividing position (6D), and the hoist control valve 7 in the neutral position (7N). Hence, it is possible to reduce a pressure loss in the center bypass line CL connecting the first hydraulic pump 2 and the hydraulic operating fluid tank 22 to each other, and reduce the delivery pressure of the first hydraulic pump 2. As a result, a load on the first hydraulic pump 2 is reduced, and therefore a load on the engine 1 is decreased. Hence, the present embodiment can reduce an energy loss of the first hydraulic pump 2, and therefore reduce fuel consumption.

The second embodiment described above produces the following actions and effects.

(1) The fan control valve 5, the confluence control valve 6, and the hoist control valve 7 are connected in tandem to the center bypass line (hydraulic fluid line) CL connecting the first hydraulic pump 2 and the hydraulic operating fluid tank 22 to each other. On the center bypass line CL, the fan control valve 5 is disposed on an upstream side of the confluence control valve 6, and the confluence control valve 6 is disposed on an upstream side of the hoist control valve 7. The confluence control valve 6 has the confluence position (6C) that makes the hydraulic operating fluid delivered from the second hydraulic pump 3 merge with the hydraulic operating fluid delivered from the first hydraulic pump 2 and introduces a resulting hydraulic operating fluid into the hoist control valve 7, and the neutral position (6N) and the flow dividing position (6D) as a non-confluence position that introduces the hydraulic operating fluid delivered from the first hydraulic pump 2 into the hoist control valve 7 and introduces the hydraulic operating fluid delivered from the second hydraulic pump 3 into the steering circuit 33.

The fan control valve 5 has the neutral position (5N) that makes the first hydraulic pump 2 and the confluence control valve 6 communicate with each other and interrupts communication between the first hydraulic pump 2 and the fan motor (hydraulic motor) 8, and the normal rotation position (5F) and the reverse rotation position (5R) as a rotation position that interrupts the communication between the first hydraulic pump 2 and the confluence control valve 6 and makes the first hydraulic pump 2 and the fan motor 8 communicate with each other.

When the confluence control valve 6 is in the confluence position (6C), the confluence control valve 6 makes the first hydraulic pump 2 and the hoist control valve 7 communicate with each other via the fan control valve 5 in the neutral position (5N) and makes the second hydraulic pump 3 and the hoist control valve 7 communicate with each other, and interrupts communication between the second hydraulic pump 3 and the steering circuit 33. When the confluence control valve 6 is in the non-confluence position (6N) or (6D), the confluence control valve 6 makes the first hydraulic pump 2 and the hoist control valve 7 communicate with each other via the fan control valve 5 in the neutral position (5N) and makes the second hydraulic pump 3 and the steering circuit 33 communicate with each other, and interrupts the communication between the second hydraulic pump 3 and the hoist control valve 7.

According to this configuration, when the hoist cylinder 10 is not driven during travelling or the like, and the fan control valve 5 is switched to the neutral position (5N), the hydraulic operating fluid delivered from the first hydraulic pump 2 is introduced into the hydraulic operating fluid tank 22 through the fan control valve 5, the confluence control valve 6, and the hoist control valve 7. It is therefore possible to suppress the occurrence of an energy loss when the cooling fan 9 is stopped during travelling or the like. As a result, fuel consumption of the dump truck 100 can be reduced. Incidentally, the hydraulic operating fluid delivered from the second hydraulic pump 3 is introduced into the steering circuit 33 through the confluence control valve 6, and therefore turning can be performed in an optional direction during travelling.

The steering circuit 33 is operated with a high frequency during travelling. Here, in a case of a configuration that makes the hydraulic operating fluid of the first hydraulic pump 2 merge with the hydraulic operating fluid of the second hydraulic pump 3 and introduces a resulting hydraulic operating fluid into the steering circuit 33 during a stop of the cooling fan 9, an operating pressure of the steering circuit 33 is caused to the first hydraulic pump 2. In the present embodiment, on the other hand, the operating pressure of the steering circuit 33 does not act on the first hydraulic pump 2 at a time of a stop of the cooling fan 9 during the travelling of the dump truck 100. The life of the first hydraulic pump 2 can therefore be improved.

(2) The controller 50 determines whether the cooling water temperature (temperature of the cooling object) Tc sensed by the temperature sensor 25 is equal to or higher than the first threshold value Tc1. When the cooling water temperature Tc is equal to or higher than the first threshold value Tc1, the controller 50 switches the fan control valve 5 to the normal rotation position (rotation position) 5F. When the cooling water temperature Tc is lower than the first threshold value Tc1, the controller 50 switches the fan control valve 5 to the neutral position (5N).

The dump truck 100 according to the present embodiment uses the hoist cylinder 10 with a low frequency. Thus, the hydraulic pump (first hydraulic pump 2) that supplies the hydraulic operating fluid to the hoist cylinder 10 and the fan motor 8 is shared therebetween. In addition, the fan control valve 5 as a single control valve combines a function of switching a supply destination of the hydraulic operating fluid delivered from the first hydraulic pump 2 to the hoist cylinder 10 or to the fan motor 8, and a function of switching the fan motor 8 between the rotation and stopping. Therefore, control valves for implementing the respective functions do not need to be provided separately, so that the configuration of a hydraulic circuit can be simplified. In addition, when a low-load travelling state is continued, and the cooling water temperature Tc has become lower than the first threshold value Tc1 due to the cooling air and the travelling wind, the fan control valve 5 is switched to the neutral position (5N). Thus, the generation of the cooling air by the cooling fan 9 is stopped, so that an overcooling of the engine cooling water can be prevented. That is, the present embodiment can provide the dump truck (transportation vehicle) 100 that can prevent an overcooling of the engine cooling water (cooling object) with a simple configuration.

(3) The controller 50 controls the delivery capacity q of the first hydraulic pump 2 to a delivery capacity higher than the minimum capacity $q_{min}$, when the cooling water temperature Tc is equal to or higher than the first threshold value Tc1. When the cooling water temperature Tc is lower than the first threshold value Tc1, the controller 50 controls the delivery capacity q of the first hydraulic pump 2 to the minimum capacity $q_{min}$. According to this configuration, when the cooling water temperature Tc becomes lower than the first threshold value Tc1 during travelling, the fan control valve 5 is switched to the neutral position (5N), and the delivery capacity q of the first hydraulic pump 2 is reduced. Consequently, a load on the engine 1 is reduced, so that fuel consumption during travelling can be reduced.

(4) The controller 50 increases the delivery capacity q of the first hydraulic pump 2 as the cooling water temperature Tc rises when the cooling water temperature Tc is equal to or higher than the first threshold value Tc1 and lower than the second threshold value Tc2. In addition, the controller 50 controls the delivery capacity q of the first hydraulic pump 2 to the maximum capacity $q_{max}$ when the cooling water temperature Tc is equal to or higher than the second threshold value Tc2.

According to this configuration, as the cooling water temperature Tc rises, the rotational speed of the cooling fan 9 is raised, and thereby a cooling effect on the engine cooling water can be enhanced. Controlling the rotational speed of the cooling fan 9 according to the cooling water temperature Tc can inhibit the engine cooling water from becoming too low or too high.

(5) The confluence control valve 6 has, as a non-confluence position, the neutral position (6N) that introduces the hydraulic operating fluid delivered from the first hydraulic pump 2 into the hoist control valve 7 and introduces the hydraulic operating fluid delivered from the second hydraulic pump 3 into the steering circuit 33, and the flow dividing position (6D) that introduces the hydraulic operating fluid delivered from the first hydraulic pump 2 into the hoist control valve 7 and divides and introduces the hydraulic operating fluid delivered from the second hydraulic pump 3 into the steering circuit 33 and the attachment actuator 86. According to this configuration, a load on the engine 1 can be reduced even when the confluence control valve 6 is switched to either of the neutral position (6N) and the flow dividing position (6D) at a time of a stop of the cooling fan 9 during the travelling of the dump truck 100.

(6) The fan control valve 5 has, as a rotation position, the normal rotation position (5F) for rotating the fan motor 8 in the normal rotation direction, and the reverse rotation position (5R) for rotating the fan motor 8 in the reverse rotation direction opposite from the normal rotation direction. When the fan control valve 5 is switched to the reverse rotation position (5R), a cooling air flowing in a forward direction from the cooling fan 9 is generated, and removes dust adhering to a filter for the air holes of the front grille 107, clearances in the radiator (heat exchanger) 23, and the like. Hence, the present embodiment can easily recover the cooling performance of the radiator 23 which cooling performance is decreased by the dust.

Incidentally, the controller 50 can be configured to temporarily switch the fan control valve 5 to the reverse rotation position (5R) at a time of maintenance of the dump truck 100 or on a periodic basis, for example. When an input device is operated by a serviceperson at the time of the maintenance, and a reverse rotation command for the cooling fan 9 is input from the input device to the controller 50, the controller 50 switches the fan control valve 5 to the reverse rotation position (5R) only for a predetermined time. In addition, the controller 50 measures an operation time of the dump truck 100 by a timer function, and switches the fan control valve 5 to the reverse rotation position (5R) only for a predetermined time each time the operation time exceeds a predetermined operation time. Incidentally, the controller 50 may temporarily switch the fan control valve 5 to the reverse rotation position (5R) at a time of starting the engine 1 or at a time of stopping the engine 1.

(7) The hydraulic system 110 includes the pair of motor hydraulic fluid lines 81 and 82 connecting the fan control valve 5 and the fan motor 8 to each other, and the pair of check valves 13 and 14 provided between the pair of motor hydraulic fluid lines 81 and 82 and the hydraulic operating fluid tank 22. With this configuration, when the cooling fan 9 is rotated by the travelling wind, for example, in a state in which the fan control valve 5 is switched to the neutral position (5N), the hydraulic operating fluid is resupplied from the hydraulic operating fluid tank 22 to the suction port of the fan motor 8 through the check valves 13 and 14, and the hydraulic operating fluid is resupplied from the hydraulic operating fluid tank 22 to the suction port of the fan motor 8 through the fan control valve 5. Hence, it is possible to suppress a negative pressure at the suction port of the fan motor 8, and thereby prevent the occurrence of cavitation. That is, damage to the fan motor 8 due to cavitation can be prevented. Because the hydraulic operating fluid is resupplied from the hydraulic operating fluid tank 22 to the suction port of the fan motor 8 through not only the check valves 13 and 14 but also the fan control valve 5, the occurrence of cavitation can be prevented effectively as compared with a case where the hydraulic operating fluid is resupplied through only the check valves 13 and 14. Incidentally, the same is true for a case where the fan control valve 5 is switched to the neutral position (5N) while the cooling fan 9 is rotating normally or rotating reversely, and the cooling fan 9 continues to rotate by inertia. That is, when the cooling fan 9 rotates by inertia, the hydraulic operating fluid is resupplied from the hydraulic operating fluid tank 22 to the suction port of the fan motor 8 through the communication line 5c of the fan control valve 5 and the check valve 13 or the check valve 14. It is therefore possible to suppress a negative pressure on the suction side of the fan motor 8.

In addition, in a state in which the spool of the fan control valve 5 is in the neutral position (5N), the motor hydraulic fluid line 81 and the motor hydraulic fluid line 82 communicate with each other. That is, the fan control valve 5 according to the present embodiment is a directional control valve of what is called a neutral free type. Therefore, the hydraulic operating fluid in the motor hydraulic fluid line on the delivery side is also supplied to the motor hydraulic fluid line on the suction side through the fan control valve 5. Hence, the present embodiment can prevent the occurrence of cavitation effectively as compared with a case where the pair of motor hydraulic fluid lines 81 and 82 is not made to communicate with each other in the neutral position (5N) (case where a directional control valve of a neutral blocking type is included).

Third Embodiment

A dump truck (transportation vehicle) according to a third embodiment of the present invention will be described with reference to FIG. 10 and FIG. 11. Incidentally, configurations identical or corresponding to the configurations described in the second embodiment are identified by the same reference symbols, and differences will be mainly described.

A controller 50 according to the third embodiment has functions to be described in the following in addition to the functions described in the second embodiment. FIG. 10 is a functional block diagram of the controller 50 according to the third embodiment. As illustrated in FIG. 10, the controller 50 is connected with a rotational speed sensor 41. The rotational speed sensor 41 senses a rotational speed N of the engine 1 (which rotational speed will hereinafter be described also as an engine rotational speed), and outputs a signal indicating a result of the sensing to the controller 50.

The determining section 54 determines the state of the engine 1 on the basis of the sensing result of the rotational speed sensor 41. The valve control section 55 controls the switching position of the confluence control valve 6 on the basis of a result of the determination of the determining section 54. The pump control section 56 controls the delivery capacities q of the first hydraulic pump 2 and the second hydraulic pump 3 on the basis of the result of the determination of the determining section 54.

FIG. 11 is a flowchart illustrating an example of a flow of processing of loss reduction control at a time of a start of the engine which processing is performed by the controller 50 according to the third embodiment. The processing illustrated in the flowchart of FIG. 11 is started by turning on the ignition switch (not illustrated), that is, turning on an ignition power supply. Incidentally, the ignition switch is an engine key switch having an off position, an on position, and a start position, for example. The ignition power supply is turned on when the ignition switch is operated from the off position to the on position. That is, electric power is supplied to the controller 50 to start the controller 50. The engine 1 is started by a starter motor 40 when the ignition switch is operated from the on position to the start position.

In step S220, on the basis of the engine rotational speed N sensed by the rotational speed sensor 41, the determining section 54 determines whether the engine 1 is being started or not, that is, whether the engine 1 is being cranked or not by the starter motor 40. The determining section 54 determines, for example, whether the engine rotational speed N is higher than 0 or not. When the engine rotational speed N is 0, the determining section 54 determines that the engine 1 is not being started. When the engine rotational speed N is higher than 0, the determining section 54 determines that the engine 1 is being started, and advances the processing to step S230. The determining section 54 performs the processing of step S220 repeatedly in a predetermined control cycle until the determining section 54 determines that the engine 1 is being started.

In step S230, the pump control section 56 outputs a control signal for setting the delivery capacity q of the first hydraulic pump 2 to the minimum capacity qmin to the regulators 2a and 3a. The pump control section 56 then advances the processing to step S240.

In step S240, the valve control section 55 outputs an ON signal to the solenoid valve 20 and outputs an OFF signal to the solenoid valve 21, and thereby switches the confluence control valve 6 to the confluence position (6C). Incidentally, though not illustrated in the figure, the valve control section 55 outputs an OFF signal to the solenoid valves 16 to 19. Thus, the hoist control valve 7 is retained in the neutral position (7N), and the fan control valve 5 is retained in the neutral position (5N). When the processing (S240) of switching the confluence control valve 6 to the confluence position (6C) is completed, the processing proceeds to step S250.

In step S250, on the basis of the engine rotational speed N sensed by the rotational speed sensor 41, the determining section 54 determines whether the starting of the engine 1 is completed or not. For example, when the engine rotational speed N is equal to or higher than an idling rotational speed (speed threshold value) Ni, the determining section 54 determines that the starting of the engine 1 is completed, and advances the processing to step S270. When the engine rotational speed N is lower than the idling rotational speed (speed threshold value) Ni, the determining section 54 determines that the starting of the engine 1 is not completed, and returns the processing to step S230. Incidentally, the speed threshold value as to whether the starting of the engine 1 is completed or not may be a value slightly lower than the idling rotational speed Ni.

In addition, a method for determining whether the starting of the engine 1 is completed is not limited to the above-described method, but the following determining method may be adopted. For example, the determining section 54 determines that the starting of the engine 1 is completed when a state in which the engine rotational speed N is equal to or higher than the speed threshold value has continued for a predetermined time. The determining section 54 determines that the starting of the engine 1 is not completed when the state in which the engine rotational speed N is equal to or higher than the speed threshold value has not continued for the predetermined time.

In step S270, the valve control section 55 outputs an OFF signal to the solenoid valve 20 and outputs an OFF signal to the solenoid valve 21, and thereby switches the confluence control valve 6 to the neutral position (6N). The valve control section 55 then ends the processing illustrated in the flowchart of FIG. 11. Incidentally, when the processing illustrated in the flowchart of FIG. 11 is ended, the controller 50 makes a transition to the processing illustrated in the flowchart of FIG. 7.

Description will be made of a main operation of the hydraulic system 110 when the engine 1 is started by the starter motor 40 in the dump truck 100 according to the present third embodiment. When the operator operates the ignition switch from the off position to the start position via the on position, electric power is supplied to the starter motor 40 to drive the starter motor 40. The cranking of the engine 1 by the starter motor 40 is thereby started. During the cranking operation, the rotational speed of the engine 1 does not reach the idling rotational speed as a minimum rotational speed after completion of the starting of the engine.

The controller 50 determines whether the engine (prime mover) 1 is being started or not. When determining that the engine 1 is being started, the controller 50 outputs a control signal for switching the confluence control valve 6 to the confluence position (6C) (ON signal to the solenoid valve 20) (S220 and S240). Incidentally, the fan control valve 5 and the hoist control valve 7 are respectively retained in the neutral positions (5N) and (7N). Thus, the first hydraulic pump 2 and the hydraulic operating fluid tank 22 communicate with each other via the fan control valve 5, the confluence control valve 6, and the hoist control valve 7. When the engine 1 is started by the starter motor 40, the confluence control valve 6 is switched to the confluence position (6C), so that the hydraulic operating fluid delivered from the first hydraulic pump 2 and the hydraulic operating fluid delivered from the second hydraulic pump 3 merge with each other and are discharged into the hydraulic operating fluid tank 22 through the center bypass line CL. Hence, according to the present embodiment, a load on the second hydraulic pump 3 can be reduced as compared with a case where the engine 1 is started in a state in which the confluence control valve 6 is positioned in the neutral position (6N). It is thereby possible to reduce a load acting on the engine 1, and therefore improve startability of the engine 1 by the starter motor 40.

Further, when the controller 50 determines that the engine 1 is being started, the controller 50 controls the delivery capacities q of the first hydraulic pump 2 and the second hydraulic pump 3 to the minimum capacities qmin (S220 and S230). According to this configuration, the load acting on the engine 1 can be reduced as compared with a case where the starting of the engine 1 is performed in a state in which the delivery capacities q of the first hydraulic pump 2 and the second hydraulic pump 3 are higher than the minimum capacities qmin due to, for example, the control of the delivery capacity q of the first hydraulic pump 2 to a value corresponding to the cooling water temperature Tc at a time of the starting of the engine. The startability of the engine 1 can be thereby further improved.

Thus, the present third embodiment can improve the engine startability in addition to the actions and effects described in the second embodiment. Under an environment of a low atmospheric temperature as in winter, a cold region, or the like in which the hydraulic operating fluid has a low temperature, in particular, a load on the hydraulic pumps tends to increase. The present third embodiment can provide the dump truck 100 that is excellent in engine startability even under an environment of a low atmospheric temperature.

Fourth Embodiment

A dump truck (transportation vehicle) according to a fourth embodiment of the present invention will be described with reference to FIG. 12 and FIG. 13. Incidentally, configurations identical or corresponding to the configurations described in the second embodiment are identified by the same reference symbols, and differences will be mainly described.

The controller 50 according to the second embodiment retains the fan control valve 5 in the neutral position (5N) irrespective of the cooling water temperature Tc when the operation position of the operation device 91 for the bed is in the raising position or the lowering position. On the other hand, when the cooling water temperature Tc has risen to the vicinity of a warning temperature, the controller 50 according to the fourth embodiment switches the fan control valve 5 to the normal rotation position (5F) even in a case where the operation position of the operation device 91 for the bed is in the raising position or the lowering position. Incidentally, the warning temperature is a temperature at which a warning is output to prevent an overheating of the engine 1.

The controller 50 according to the fourth embodiment gives priority to the operation of the hoist cylinder 10 in a case where the operation device 91 is operated to the raising position or the lowering position when the cooling water temperature Tc is lower than a third threshold value Tc3 higher than the second threshold value Tc2. The controller 50 according to the fourth embodiment gives priority to the operation of the fan motor 8 in a case where the operation device 91 is operated to the raising position or the lowering position when the cooling water temperature Tc is equal to or higher than the third threshold value Tc3. The third threshold value Tc3 corresponds to, for example, a temperature slightly lower than the warning temperature, and is stored in the nonvolatile memory 52 in advance.

FIG. 12 is a functional block diagram of the controller 50 according to the fourth embodiment. The determining section 54 determines whether the cooling water temperature Tc sensed by the temperature sensor 25 is equal to or higher than the third threshold value Tc3.

The determining section 54 determines the operation position of the operation device 91, that is, what kind of operation is performed on the hoist cylinder 10, on the basis of a signal indicating the operation position which signal is output from the operation device 91. Specifically, the determining section 54 determines whether a hoist raising operation for switching the hoist control valve 7 to the raising position (7R) is being performed by the operation device 91. The determining section 54 determines whether a hoist lowering operation for switching the hoist control valve 7 to the lowering position (7L) is being performed by the operation device 91. The determining section 54 determines whether a floating operation for switching the hoist control valve 7 to the floating position (7F) is being performed by the operation device 91.

FIG. 13 is a table illustrating the relation of the operation position of the operation device 91 for the bed and the cooling water temperature Tc to the switching positions of the respective control valves 5 to 7. As illustrated in FIG. 13, the valve control section 55 controls the hoist control valve 7, the confluence control valve 6, and the fan control valve 5 by outputting control signals to the solenoid valves 16 to 21 on the basis of a determination result of the determining section 54.

The valve control section 55 retains the hoist control valve 7 in the neutral position (7N), and retains the confluence control valve 6 in the neutral position (6N) when the operation position of the operation device 91 is the neutral position, that is, when the operation device 91 is in a non-operated state (initial state). When the operation position of the operation device 91 is the raising position, that is, when the hoist raising operation is being performed by the operation device 91, the valve control section 55 switches the hoist control valve 7 to the raising position (7R), and switches the confluence control valve 6 to the confluence position (6C). When the operation position of the operation device 91 is the lowering position, that is, when the hoist lowering operation is being performed by the operation device 91, the valve control section 55 switches the hoist control valve 7 to the lowering position (7L) while retaining the confluence control valve 6 in the neutral position (6N). When the operation position of the operation device 91 is the floating position, that is, when the floating operation is being performed by the operation device 91, the valve control section 55 switches the hoist control valve 7 to the floating position (7F) while retaining the confluence control valve 6 in the neutral position (6N).

As in the second embodiment, in a case where the operation position of the operation device 91 is in the neutral position or the floating position, the valve control section 55 retains the fan control valve 5 in the neutral position (5N) when the cooling water temperature Tc is lower than the first threshold value Tc1, and the valve control section 55 switches the fan control valve 5 to the normal rotation position (5F) when the cooling water temperature Tc is equal to or higher than the first threshold value Tc1.

On the other hand, in a case where the operation position of the operation device 91 is in the raising position or the lowering position, the valve control section 55 retains the fan control valve 5 in the neutral position (5N) when the cooling water temperature Tc is lower than the third threshold value Tc3, and the valve control section 55 switches the fan control valve 5 to the normal rotation position (5F) when the cooling water temperature Tc is equal to or higher than the third threshold value Tc3.

As described above, when the hoist raising operation is performed by the operation device 91, the controller 50 according to the present fourth embodiment switches the hoist control valve 7 to the raising position, and switches the confluence control valve 6 to the confluence position (6C). In addition, in a case where the hoist raising operation is performed when the cooling water temperature Tc is lower than the third threshold value Tc3, the controller 50 switches the fan control valve 5 to the neutral position (5N) even when the cooling water temperature Tc is equal to or higher than the first threshold value Tc1. Thus, the hydraulic operating fluids delivered from both of the first hydraulic pump 2 and the second hydraulic pump 3 merge with each other in the confluence control valve 6, and are supplied to the hoist cylinder 10. As a result, the hoist cylinder 10 can be extended smoothly.

On the other hand, in a case where the hoist raising operation is performed when the cooling water temperature Tc is equal to or higher than the third threshold value Tc3, the controller 50 switches the fan control valve 5 to the normal rotation position (5F). Thus, the hydraulic operating fluid delivered from the first hydraulic pump 2 is supplied to the fan motor 8 through the fan control valve 5, and the hydraulic operating fluid delivered from the second hydraulic pump 3 is supplied to the hoist cylinder 10 through the confluence control valve 6. As a result, the hoist cylinder 10 can be extended while the engine cooling water is cooled by generating cooling air by the cooling fan 9. Hence, the present fourth embodiment can prevent an overheating of the engine 1.

The following modifications are also within the scope of the present invention. It is possible to combine a configuration illustrated in a modification and a configuration described in a foregoing embodiment with each other, combine configurations described in foregoing different embodiments with each other, or combine configurations described in following different modifications with each other.

First Modification

In the foregoing embodiments, description has been made of an example in which the pump control section 56 controls the delivery capacity q of the first hydraulic pump 2 on the basis of the capacity control table that defines the relation between the cooling water temperature Tc and the delivery capacity q of the first hydraulic pump 2. However, a method for controlling the delivery capacity q of the first hydraulic pump 2 is not limited to the method described in the foregoing embodiments. For example, the pump control section 56 may control the delivery capacity q of the first hydraulic pump 2 on the basis of an equation (function) that defines the relation between the cooling water temperature Tc and the delivery capacity q of the first hydraulic pump 2.

In addition, the pump control section 56 may control the delivery capacity q on the basis of a determination result of the determining section 54 without the use of the capacity control table or the equation. For example, the pump control section 56 controls the delivery capacity q to the minimum capacity qmin when it is determined that the cooling water temperature Tc is lower than the first threshold value Tc1. The pump control section 56 controls the delivery capacity q to the maximum capacity qmax when it is determined that the cooling water temperature Tc is equal to or higher than the second threshold value Tc2. In this case, in a process in which the cooling water temperature Tc rises from a state of being lower than the first threshold value Tc1 to the second threshold value Tc2, the delivery capacity q is controlled to the minimum capacity qmin, and when the cooling water temperature Tc exceeds the second threshold value Tc2, the delivery capacity q is controlled to the maximum capacity qmax. In addition, in a process in which the cooling water temperature Tc decreases from a state of being equal to or higher than the second threshold value Tc2 to the first threshold value Tc1, the delivery capacity q is controlled to the maximum capacity qmax, and when the cooling water temperature Tc becomes lower than the first threshold value Tc1, the delivery capacity q is controlled to the minimum capacity qmin.

Second Modification

In the third embodiment, description has been made of an example in which the determining section 54 determines whether the engine 1 is being started or not on the basis of a sensing result of the rotational speed sensor 41. However, a method for determining whether the engine 1 is being started or not is not limited to this. For example, the determining section 54 may determine that the engine 1 is being started when the ignition switch (engine key switch) is operated to the start position, and the determining section 54 may determine that the engine 1 is not being started when the ignition switch (engine key switch) is not operated to the start position.

Third Modification

In the third embodiment, description has been made of an example in which the delivery capacities q of the first hydraulic pump 2 and the second hydraulic pump 3 are controlled to the minimum capacities qmin during the starting of the engine 1. However, the processing of step S230 in FIG. 11 may be omitted.

Fourth Modification

In the foregoing embodiments, description has been made of an example in which the prime mover that drives the first hydraulic pump 2 and the second hydraulic pump 3 is the engine 1. However, the prime mover may be an electrically driven motor.

Fifth Modification

In the foregoing embodiments, description has been made of an example in which the cooling object to be cooled by the cooling air is the engine cooling water that cools the engine 1. However, the cooling object to be cooled by the cooling air is not limited to this. For example, the cooling object to be cooled by the cooling air may be a cooling oil that cools a brake device. In addition, when a travelling electrically driven motor and a travelling inverter that controls the travelling electrically driven motor are provided as a driving source of a travel device that makes the vehicle body 101 travel, cooling water for cooling the travelling inverter may be the cooling object to be cooled by the cooling air.

Further, the cooling object may be the hydraulic operating fluid. An oil cooler cools the hydraulic operating fluid by effecting heat exchange between the hydraulic operating fluid and the cooling air. In this case, the circulation system of the cooling object is constituted by a hydraulic circuit including the hydraulic operating fluid tank 22 and the hydraulic pumps (the first hydraulic pump 2 and the second hydraulic pump 3). The viscosity of the hydraulic operating fluid increases according to decrease in temperature of the hydraulic operating fluid. Therefore, when the hydraulic operating fluid is in an overcooled state, the hydraulic operating fluid having a high viscosity is delivered from the hydraulic pump, and a pressure loss within the hydraulic fluid lines increases. As a result, a load on the hydraulic pumps is increased, which degrades fuel consumption. However, according to the modification of the present embodiments, when the temperature of the hydraulic operating fluid becomes lower than the first threshold value Tc1, the rotation of the cooling fan 9 is stopped to prevent an overcooling of the hydraulic operating fluid. It is therefore possible to prevent an increase in the load on the hydraulic pumps.

Sixth Modification

In the foregoing embodiments, description has been made of a case where the temperature of the engine cooling water becomes lower than the first threshold value Tc1 due to the travelling wind and the cooling air in a low-load travelling state as a case where cooling using the cooling fan 9 becomes unnecessary. However, the case where the cooling of the engine cooling water becomes unnecessary is not limited to this. For example, under an environment of a low atmospheric temperature, the cooling of the engine cooling water may become unnecessary in some cases even when the radiator 23 is not disposed in such a position as to directly receive the travelling wind. That is, the heat exchanger such as the radiator 23 is not limited to being disposed in the front portion of the vehicle body 101. The present invention is also applicable to transportation vehicles in which the heat exchanger is disposed in a side portion or a rear portion of the vehicle body 101.

Seventh Modification

In the second to fourth embodiments, description has been made of an example in which the confluence control valve 6 is a six-port three-position directional control valve. However, the confluence control valve 6 may be a six-port two-position directional control valve not having the flow dividing position (6D).

As described above, a transportation vehicle according to the foregoing embodiments includes: at least one hydraulic pump that is driven by a prime mover; a hydraulic motor that is driven by a hydraulic operating fluid supplied from a first hydraulic pump of the at least one hydraulic pump; a cooling fan that is driven by the hydraulic motor; a heat exchanger that is disposed in a front portion of a vehicle body, and cools a cooling object by cooling air generated by the cooling fan; a hydraulic cylinder that is driven by the hydraulic operating fluid supplied from the first hydraulic pump; a fan control valve that controls a flow of the hydraulic operating fluid supplied from the first hydraulic pump to the hydraulic motor; a cylinder control valve that controls a flow of the hydraulic operating fluid supplied from the first hydraulic pump to the hydraulic cylinder; and a controller that controls the fan control valve and a delivery capacity of the at least one hydraulic pump. The fan control valve and the cylinder control valve are connected in tandem to a hydraulic fluid line that connects the first hydraulic pump and a hydraulic operating fluid tank to each other. The fan control valve is disposed on an upstream side of the cylinder control valve. The fan control valve has a neutral position that makes the first hydraulic pump and the cylinder control valve communicate with each other, interrupts communication between the first hydraulic pump and the hydraulic motor, and makes a suction port and a delivery port of the hydraulic motor and the hydraulic operating fluid tank communicate with each other, and a rotation position that interrupts the communication between the first hydraulic pump and the cylinder control valve, makes the first hydraulic pump and the suction port of the hydraulic motor communicate with each other, and makes the delivery port of the hydraulic motor and the hydraulic operating fluid tank communicate with each other. It is thereby possible to provide the transportation vehicle that can prevent an overcooling of the cooling object with a simple configuration.

Embodiments of the present invention have been described above. However, the foregoing embodiments merely represent a part of examples of application of the present invention, and are not intended to limit the technical scope of the present invention to concrete configurations of the foregoing embodiments.

DESCRIPTION OF REFERENCE CHARACTERS

1: Engine (prime mover)
2: First hydraulic pump (hydraulic pump)
2a: Regulator
3: Second hydraulic pump (hydraulic pump)
3a: Regulator
4: Pilot pump
5: Fan control valve
5a, 5b: Hydraulic pilot portion
5F: Normal rotation position (rotation position)
5N: Neutral position
5R: Reverse rotation position (rotation position)
6: Confluence control valve
6a, 6b: Hydraulic pilot portion
6C: Confluence position
6D: Flow dividing position (non-confluence position)
6N: Neutral position (non-confluence position)
7: Hoist control valve (cylinder control valve)
7a, 7b: Hydraulic pilot portion
7F: Floating position
7L: Lowering position
7N: Neutral position
7R: Raising position
8: Fan motor (hydraulic motor)
9: Cooling fan
10: Hoist cylinder (hydraulic cylinder)
10a: Outer cylinder portion
10b: Inner cylinder portion
10c: Piston rod
10d: Bottom side oil chamber
10e: Rod side oil chamber
11, 12: Relief valve
13, 14: Check valve
15: Pilot relief valve
16 to 21: Solenoid valve
22: Hydraulic operating fluid tank
23: Radiator (heat exchanger)
24: Cooling water circulation pump
25: Temperature sensor
26: Cooling target object
27: Cooling water tank
28: Cooling water system (circulation system)
29: Steering wheel
30: Hydraulic motor
31: Steering control valve
33: Steering circuit
34, 35: Steering cylinder
36, 37: Steering hydraulic fluid line
38: High pressure side hydraulic fluid line
39: Low pressure side hydraulic fluid line
40: Starter motor
41: Rotational speed sensor
42: Accumulator
50: Controller
51: Processing device
52: Nonvolatile memory (storage device)
53: Volatile memory (storage device)
54: Determining section
55: Valve control section
56: Pump control section
61 to 63: Supply hydraulic fluid line
68, 69: Return hydraulic fluid line
71, 72: Actuator hydraulic fluid line
80: Generator
81, 82: Motor hydraulic fluid line
85: Actuator hydraulic fluid line
86: Attachment actuator
91: Operation device
91a: Operation lever
100: Dump truck (transportation vehicle)

101: Vehicle body
102: Supporting base
103: Cab
104: Bed
105: Front wheel
106: Rear wheel
107: Front grille
110: Hydraulic system
CL: Center bypass line (hydraulic fluid line)
N: Engine rotational speed
Ni: Idling rotational speed (speed threshold value)
q: Delivery capacity (displacement volume)
Q: Delivery flow rate
qmax: Maximum capacity
Qmax: Maximum flow rate
qmin: Minimum capacity
Qmin: Minimum flow rate
Tc: Cooling water temperature (temperature of a cooling object)
Tc1: First threshold value
Tc2: Second threshold value
Tc3: Third threshold value

The invention claimed is:

1. A transportation vehicle comprising:
at least one hydraulic pump that is driven by a prime mover;
a hydraulic motor that is driven by a hydraulic operating fluid supplied from a first hydraulic pump of the at least one hydraulic pump;
a cooling fan that is driven by the hydraulic motor;
a heat exchanger that is disposed in a front portion of a vehicle body, and cools a cooling object by cooling air generated by the cooling fan;
a hydraulic cylinder that is driven by the hydraulic operating fluid supplied from the first hydraulic pump;
a fan control valve that controls a flow of the hydraulic operating fluid supplied from the first hydraulic pump to the hydraulic motor;
a cylinder control valve that controls a flow of the hydraulic operating fluid supplied from the first hydraulic pump to the hydraulic cylinder; and
a controller that controls the fan control valve and a delivery capacity of the at least one hydraulic pump,
the fan control valve and the cylinder control valve being connected in tandem to a hydraulic fluid line that connects the first hydraulic pump and a hydraulic operating fluid tank to each other,
the fan control valve
being disposed on an upstream side of the cylinder control valve,
having a neutral position that makes the first hydraulic pump and the cylinder control valve communicate with each other, interrupts communication between the first hydraulic pump and the hydraulic motor, and makes a suction port and a delivery port of the hydraulic motor and the hydraulic operating fluid tank communicate with each other, and
having a rotation position that interrupts the communication between the first hydraulic pump and the cylinder control valve, makes the first hydraulic pump and the suction port of the hydraulic motor communicate with each other, and makes the delivery port of the hydraulic motor and the hydraulic operating fluid tank communicate with each other.

2. The transportation vehicle according to claim 1, wherein
the transportation vehicle includes a bed rotatably provided to the vehicle body,
the at least one hydraulic pump includes the first hydraulic pump and a second hydraulic pump,
the hydraulic cylinder is a hoist cylinder extendably and contractably provided between the bed and the vehicle body,
the cylinder control valve is a hoist control valve that controls a flow of the hydraulic operating fluid supplied from the first hydraulic pump to the hoist cylinder,
the transportation vehicle further includes
a steering circuit having a steering cylinder that is driven by a hydraulic operating fluid supplied from the second hydraulic pump, and
a confluence control valve having a confluence position that makes the hydraulic operating fluid delivered from the second hydraulic pump merge with the hydraulic operating fluid delivered from the first hydraulic pump and introduces a resulting hydraulic operating fluid into the hoist control valve, and a non-confluence position that introduces the hydraulic operating fluid delivered from the first hydraulic pump into the hoist control valve and introduces the hydraulic operating fluid delivered from the second hydraulic pump into the steering circuit,
the fan control valve, the confluence control valve, and the hoist control valve are connected in tandem to the hydraulic fluid line that connects the first hydraulic pump and the hydraulic operating fluid tank to each other,
the fan control valve is disposed on an upstream side of the confluence control valve,
the confluence control valve is disposed on an upstream side of the hoist control valve,
the fan control valve has
a neutral position that makes the first hydraulic pump and the confluence control valve communicate with each other, and interrupts the communication between the first hydraulic pump and the hydraulic motor, and
a rotation position that interrupts the communication between the first hydraulic pump and the confluence control valve, and makes the first hydraulic pump and the hydraulic motor communicate with each other, and
the confluence control valve
makes the first hydraulic pump and the hoist control valve communicate with each other via the fan control valve in the neutral position, makes the second hydraulic pump and the hoist control valve communicate with each other, and interrupts communication between the second hydraulic pump and the steering circuit, when the confluence control valve is in the confluence position, and
makes the first hydraulic pump and the hoist control valve communicate with each other via the fan control valve in the neutral position, makes the second hydraulic pump and the steering circuit communicate with each other, and interrupts the communication between the second hydraulic pump and the hoist control valve, when the confluence control valve is in the non-confluence position.

3. The transportation vehicle according to claim 2, wherein
the prime mover is an engine that is started by a starter motor, and
the controller is configured to determine whether the engine is being started or not, and output a control signal to switch the confluence control valve to the confluence position when the controller determines that the engine is being started.

4. The transportation vehicle according to claim 3, wherein the controller is configured to control delivery capacities of the first hydraulic pump and the second hydraulic pump to minimum capacities when the controller determines that the engine is being started.

5. The transportation vehicle according to claim 2, wherein the transportation vehicle includes a temperature sensor that senses a temperature of the cooling object, the controller is configured to determine whether the temperature of the cooling object sensed by the temperature sensor is equal to or higher than a first threshold value, switch the fan control valve to the rotation position when the temperature of the cooling object is equal to or higher than the first threshold value, and switch the fan control valve to the neutral position when the temperature of the cooling object is lower than the first threshold value.

6. The transportation vehicle according to claim 5, wherein the controller is configured to control the delivery capacity of the first hydraulic pump to a delivery capacity higher than a minimum capacity when the temperature of the cooling object is equal to or higher than the first threshold value, and control the delivery capacity of the first hydraulic pump to the minimum capacity when the temperature of the cooling object is lower than the first threshold value.

7. The transportation vehicle according to claim 6, wherein the controller is configured to increase the delivery capacity of the first hydraulic pump as the temperature of the cooling object rises when the temperature of the cooling object is equal to or higher than the first threshold value and lower than a second threshold value, and control the delivery capacity of the first hydraulic pump to a maximum capacity when the temperature of the cooling object is equal to or higher than the second threshold value.

8. The transportation vehicle according to claim 7, wherein the transportation vehicle includes an operation device that operates the hoist cylinder, the hoist control valve has a raising position that rotates the bed upward by extending the hoist cylinder, a lowering position that rotates the bed downward by contracting the hoist cylinder, and a neutral position that holds the bed, and the controller is configured to determine whether the temperature of the cooling object sensed by the temperature sensor is equal to or higher than a third threshold value higher than the second threshold value, determine whether a hoist raising operation for switching the hoist control valve to the raising position is being performed by the operation device, switch the hoist control valve to the raising position and switch the confluence control valve to the confluence position, when the hoist raising operation is performed by the operation device, switch the fan control valve to the neutral position even when the temperature of the cooling object is equal to or higher than the first threshold value, when the hoist raising operation is performed while the temperature of the cooling object is lower than the third threshold value, and switch the fan control valve to the rotation position when the hoist raising operation is performed while the temperature of the cooling object is equal to or higher than the third threshold value.

* * * * *